United States Patent
Swett et al.

(10) Patent No.: US 11,501,355 B2
(45) Date of Patent: Nov. 15, 2022

(54) INTEGRATION OF IMAGE CAPTURING MECHANISM INTO ECOMMERCE APPLICATION

(71) Applicant: Block, Inc., San Francisco, CA (US)

(72) Inventors: Katherine Swett, Long Island City, NY (US); Bo Han, San Francisco, CA (US); Drew Richards, Brooklyn, NY (US); John O'Brien-Carelli, Brooklyn, NY (US)

(73) Assignee: Block, Inc., San Francisco, CA (US)

( * ) Notice: Subject to any disclaimer, the term of this patent is extended or adjusted under 35 U.S.C. 154(b) by 0 days.

(21) Appl. No.: 17/530,294

(22) Filed: Nov. 18, 2021

(65) Prior Publication Data

US 2022/0076312 A1 Mar. 10, 2022

Related U.S. Application Data

(63) Continuation of application No. 16/453,800, filed on Jun. 26, 2019, now Pat. No. 11,397,977.

(51) Int. Cl.
*G06Q 30/06* (2012.01)
*G06T 7/00* (2017.01)
(Continued)

(52) U.S. Cl.
CPC ..... *G06Q 30/0625* (2013.01); *G06Q 30/0643* (2013.01); *G06T 7/0002* (2013.01);
(Continued)

(58) Field of Classification Search
None
See application file for complete search history.

(56) References Cited

U.S. PATENT DOCUMENTS 8,897,604 B2 11/2014 Deng et al.
9,542,736 B2 1/2017 Bhardwaj et al.
(Continued)

OTHER PUBLICATIONS

Anon., "Posterjack.ca: Turn Your Travel Photos Into Posters and Enjoy Your Vacation All Year Long: Top Tips on creating the poster you want!" Marketwire, Intrado Digital Media Canada, Inc. (Aug. 12, 2009) (Year: 2009).*

(Continued)

*Primary Examiner* — Nicholas D Rosen
(74) *Attorney, Agent, or Firm* — Lee & Hayes, P.C.

(57) ABSTRACT

Integrating an image capturing mechanism into an ecommerce application is described. Images of items offered for sale via ecommerce channels associated with an ecommerce service provider and performance metrics associated with the images and/or content items with which the images are presented via the ecommerce channels can be analyzed. Based partly on the analyzing, a characteristic associated with the images that are associated with a performance metric that satisfies a threshold or that are presented by the content items that are associated with the performance metric that satisfies the threshold can be determined. A new image of an item to be offered for sale by a merchant via an ecommerce channel can be received and, based at least partly on the characteristic, it can be determined whether to integrate the new image into a content item for the merchant, wherein the content item to be presented via the ecommerce channel.

20 Claims, 15 Drawing Sheets

(51) Int. Cl.
*H04N 5/232* (2006.01)
*G06F 3/048* (2013.01)
*G06F 3/0482* (2013.01)

(52) U.S. Cl.
CPC ....... *H04N 5/23222* (2013.01); *G06F 3/0482* (2013.01); *G06Q 30/0641* (2013.01); *G06T 2207/30168* (2013.01)

(56) References Cited

U.S. PATENT DOCUMENTS

| | | | |
|---|---|---|---|
| 9,767,463 B2* | 9/2017 | Papageorgiou | G06Q 30/02 |
| 9,972,038 B2 | 5/2018 | Godsey et al. | |
| 9,996,930 B2* | 6/2018 | Nakagomi | G06T 7/0016 |
| 10,657,596 B1* | 5/2020 | Chavez | G06T 11/60 |
| 10,817,749 B2* | 10/2020 | Biswas | G06N 3/08 |
| 10,885,589 B2* | 1/2021 | Sauer | G06Q 20/34 |
| 11,169,669 B1 | 11/2021 | Swett et al. | |
| 11,397,977 B1 | 7/2022 | Swett et al. | |
| 2003/0083961 A1 | 5/2003 | Bezos et al. | |
| 2005/0273458 A1 | 12/2005 | Adams | |
| 2008/0301224 A1* | 12/2008 | Papageorgiou | G06Q 30/02 709/203 |
| 2012/0131486 A1 | 5/2012 | O'Leary | |
| 2013/0297453 A1 | 11/2013 | Racco | |
| 2015/0088767 A1 | 3/2015 | Varadarajan | |
| 2016/0275685 A1* | 9/2016 | Nakagomi | G06T 7/0016 |
| 2017/0132627 A1 | 5/2017 | Phillips et al. | |
| 2019/0188796 A1* | 6/2019 | Sauer | G06Q 20/102 |
| 2019/0220694 A1* | 7/2019 | Biswas | G06V 10/751 |

OTHER PUBLICATIONS

Snap36 Solutions, www.snap36.com/solutions, Aug. 2, 2017 (Year: 2017).
Non-Final Office Action dated Jan. 10, 2020, in U.S. Appl. No. 16/453,869, Swett, K., et al., filed Jun. 26, 2019.
Final Office Action dated May 11, 2020, in U.S. Appl. No. 16/453,869, Swett, K., et al., filed Jun. 26, 2019.
Non-Final Office Action dated Sep. 18, 2020, in U.S. Appl. No. 16/453,869, Swett, K., et al., filed Jun. 26, 2019.
Final Office Action dated Mar. 18, 2021, in U.S. Appl. No. 16/453,869, Swett, K., et al., filed Jun. 26, 2019.
Notice of Allowance dated Jun. 30, 2021, in U.S. Appl. No. 16/453,869, Swett, K., et al., filed Jun. 26, 2019.
Notice of Allowance dated Aug. 4, 2021, in U.S. Appl. No. 16/453,869, Swett, K., et al., filed Jun. 26, 2019.
Corrected Notice of Allowability dated Apr. 26, 2022, in U.S. Appl. No. 16/453,800, Swett, K., et al., filed Jun. 26, 2019.
Notice of Allowance dated Mar. 21, 2022, in U.S. Appl. No. 16/453,800, Swett, K., et al., filed Jun. 26, 2019.

* cited by examiner

INTEGRATION OF IMAGE CAPTURING MECHANISM INTO ECOMMERCE APPLICATION

RELATED APPLICATIONS

This Application claims priority to U.S. patent application Ser. No. 16/453,800, filed Jun. 26, 2019, and issued as U.S. Pat. No. 11,397,977 on Jul. 26, 2022, which is incorporated herein by reference.

BACKGROUND

Product imagery is important for ecommerce platforms. For instance, professional-looking product images are important for establishing trust with potential customers. Blurry, discolored, or poorly sized images can cause customers to feel insecure and uneasy about transacting with ecommerce merchants. However, many merchants do not have the skills or equipment necessary to capture professional-looking product images. Additionally or alternatively, many merchants do not have the time or attention to dedicate to product imagery as they are focused on managing other aspects of their business.

BRIEF DESCRIPTION OF THE DRAWINGS

Features of the present disclosure, its nature and various advantages, will be more apparent upon consideration of the following detailed description, taken in conjunction with the accompanying drawings.

In the figures, the left-most digit(s) of a reference number identifies the figure in which the reference number first appears. The use of the same reference numbers in different figures indicates similar or identical items or features. The drawings are not to scale.

DETAILED DESCRIPTION

Figure 1:
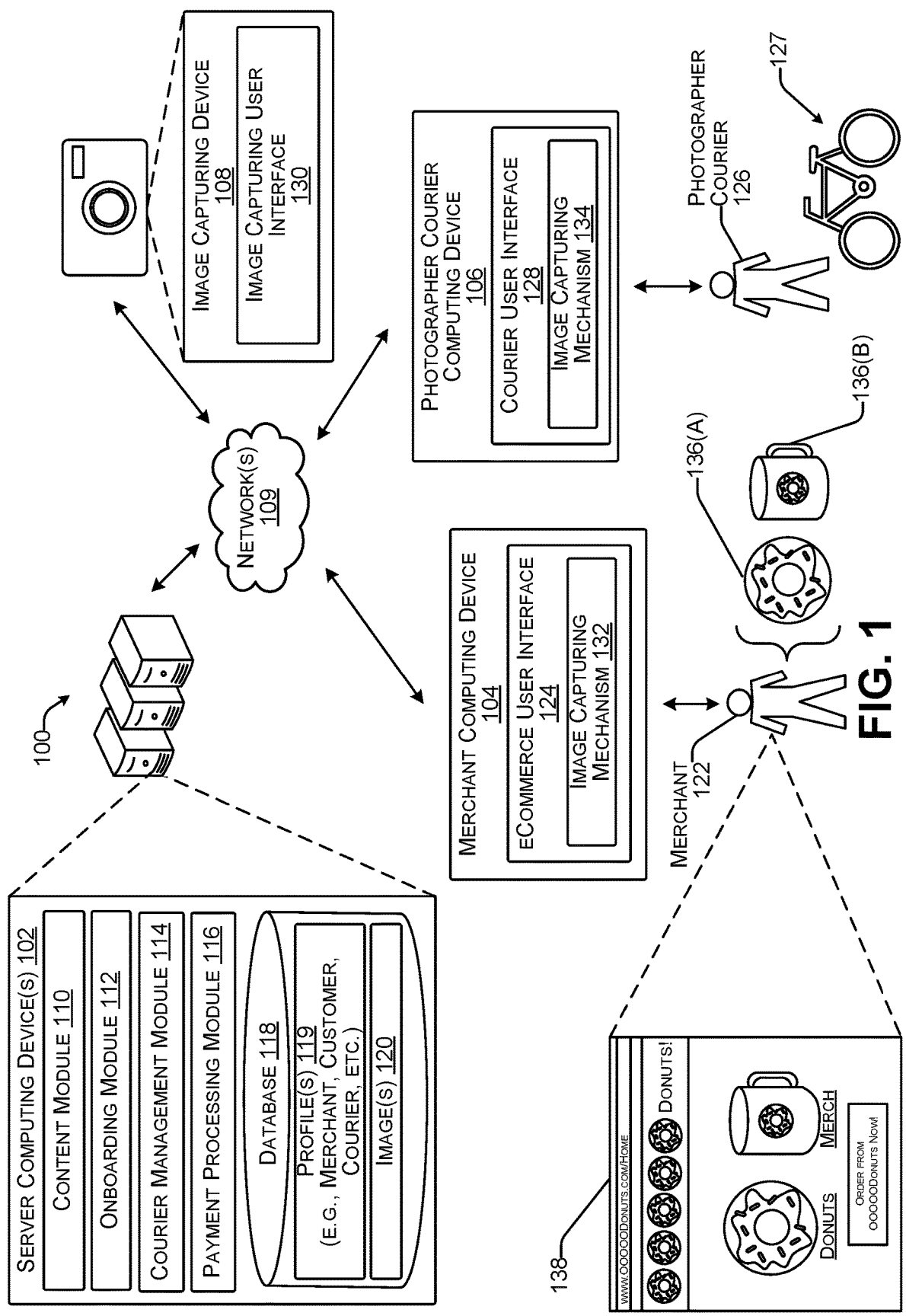
FIG. 1 illustrates an example environment for performing techniques described herein.

Integrating image capturing techniques into a commerce platform to, for example, enable merchants to access images that enhance their business operations is described herein. In an example, techniques described herein enable merchants to provide items to be offered for sale (or, currently offered for sale) to a physical location of an ecommerce service provider, which can provide image capturing services. The ecommerce service provider can utilize high-quality image capturing devices (e.g., devices that capture images at a higher resolution than ordinary mobile devices carried by merchants) to capture images of the items to be offered for sale (or, currently offered for sale) by the merchants. In some examples, the ecommerce service provider can utilize intelligence (e.g., machine learning based on images of items offered for sale by merchants and/or performance metrics associated with the images and/or content items presenting the images) for capturing high-quality, professional-looking images (e.g., images that appear to have been taken by a professional photographer due to their lighting, background, focus, or other professional characteristic). That is, the ecommerce service provider can utilize high-quality image capturing devices and/or intelligence to capture high-quality, professional-looking images of items to be offered for sale (or, currently offered for sale) by merchants. Such images can be integrated into social media posts, digital marketing materials, web pages, marketplace posts, and the like (collectively "content items"), which can be output via respective ecommerce channels for promoting such items and/or offering such items for sale. In an example where a merchant provides an item to the ecommerce service provider, the item can be returned to the merchant after images have been captured.

Additionally or alternatively, techniques described herein enable merchants to capture images of items to be offered for sale (or, currently offered for sale) without providing their items to a physical location associated with the ecommerce service provider. For instance, in some examples, techniques described herein can utilize intelligence (e.g., machine learning based on images of items offered for sale by merchants and/or performance metrics associated with the images and/or content items presenting the images) to evaluate images captured by merchants and/or to generate instructions for guiding merchants through image capturing processes via their own devices. In at least one example, a photo analyzer can evaluate images captured by merchants via their own devices, images that are stored by the merchant (e.g., on their mobile device, in a digital photo album, a cloud storage, etc.), images presented via a social networking service, or the like, to determine whether the images are "good enough" or whether a new, higher-quality, more professional-looking image is recommended. In some examples, guidance can be provided via an ecommerce application on a merchant device which can instruct a merchant how to capture a high-quality, professional-looking image using their own device. In at least one example, the ecommerce application can include an image capturing mechanism (e.g., an integrated camera mechanism) such that the merchant can capture an image via the ecommerce application and transmit the captured image to the ecommerce service provider for analysis and/or integration into content items without leaving the ecommerce application. That is, in at least one example, techniques described herein can offer an end-to-end user experience that enables merchants to capture images of items to be offered for sale (or, currently offered for sale), transmit the images to the ecommerce service provider, and cause the images to be integrated into content items that can be presented via various ecommerce channels.

Furthermore, in at least one example, techniques described herein are directed to utilizing photographer couriers to enable merchants to obtain high-quality images of items to be offered for sale. For instance, photographer couriers can travel to existing and prospective merchants to capture images of items to be offered for sale (or, currently offered for sale) and/or to pick-up the items to be offered for sale (or, currently offered for sale) and transport the items to a physical location associated with the ecommerce service provider to enable the ecommerce service provider to perform image capturing services. In such an example, responsive to receiving a request for a photographer courier, the ecommerce service provider can select a photographer courier based on location, travel time, experience, equipment, and the like, and can send a dispatch instruction to a courier application on a courier device of the photographer courier to direct the photographer courier to a location of a merchant (or, alternatively, to another location). The photographer courier can follow the dispatch instructions to the location to capture image(s) of item(s) to be offered for sale (or, currently offered for sale) by the merchant and/or to pick-up the item(s) to be offered for sale (or, currently offered for sale) and transport the item(s) to a physical location associated with the ecommerce service provider to enable the ecommerce service provider to perform image capturing services. If the item(s) are transported to the physical location of the ecommerce service provider, the photographer courier (or a different photographer courier) can transport the item(s) back to the location of the merchant. In at least one example, a physical location of the ecommerce service provider can include an image capturing facility, a physical location of another merchant, or any other physical location equipped with image capturing devices for capturing images as described herein.

Techniques described herein can utilize images—captured via the ecommerce service provider, merchants, and/or photographer couriers—for generating content items that can be presented via ecommerce channels as described above. For instance, images captured via the ecommerce service provider can be used to generate content items. For the purpose of this discussion, a content item is data that can be viewed, read, watched, listened to, interacted with, or otherwise manipulated or consumed by a user. As described above, content items can include, but are not limited to, social media posts, digital marketing materials, web pages, marketplace posts, messages (e.g., emails, text messages, push notifications, etc.), and the like. Content items can be output via respective ecommerce channels for promoting items and/or offering items for sale. In some examples, images captured via techniques described herein can additionally or alternatively be used for print marketing materials.

In addition to enabling merchants with access to high-quality, professional-looking images, in at least one example, techniques described herein can streamline onboarding processes for onboarding new users to an ecommerce service provider. In some examples, a merchant can use the image capturing services available via the ecommerce service provider without having an account with the ecommerce service provider, or without having a completed account with the ecommerce service provider. In such examples, the ecommerce service provider can generate image(s) for the merchant and, when providing the image(s) to the merchant, can additionally provide content item(s) generated based on the resulting image(s). If the merchant so chooses, the merchant can claim the content item(s) and the ecommerce service provider can generate a new account for the merchant, or complete an existing account for the merchant. That is, the image capturing services can provide a means for the ecommerce service provider to attract new users, or induce partially-onboarded users to complete their onboarding.

In some examples, the "new users" described above can be new to the ecommerce service provider such that they do not have a current account with the ecommerce service provider. However, in at least one example, a "new user" can have an account with another service provider associated with the ecommerce service provider. For instance, a "new user" can have an account with a payment processing service provider. In such an example, data associated with the existing account can be used to inform content item(s) generated for the "new user" and/or for onboarding the "new user" to the ecommerce service provider.

In an example, a merchant can sell salon products (e.g., shampoo, conditioner, color, wax, etc.). The merchant can want to capture high-quality images of the salon products to add to a web page of the merchant. In such an example, the merchant has several options as described above: (i) send, or otherwise provide, the salon products to a location of the ecommerce service provider, (ii) utilize guidance offered by the ecommerce service provider to capture images of the salon products (e.g., via the ecommerce application), and/or (iii) request a photographer courier to capture images of the salon products (e.g., at a location of the merchant) or to transport the salon products to a location of the ecommerce service provider. In some examples, the merchant can forego all of the options above and can submit their own image (e.g., having not used the guidance, for example). In any of the aforementioned examples, the resulting images can be provided to the ecommerce service provider for, in some examples, further analysis and/or integration into the web page of the merchant (e.g., if the web page is hosted by the ecommerce service provider).

If the merchant does not have an account with the ecommerce service provider (e.g., the merchant is a "new merchant"), the ecommerce service provider can integrate the resulting images into a web page and offer the web page to the merchant. In at least one example, the merchant can claim the web page and the ecommerce service provider can generate an account for the merchant. As described above, in some examples, the merchant may not have an account with the ecommerce service provider but can have an account with a payment processing service provider associated with the ecommerce service provider. In such examples, data associated with the existing account (e.g., with the payment processing service provider) can be used by the ecommerce service provider for (i) generating the web page and/or (ii) generating the new account. In at least one example, responsive to the merchant claiming the web page and the ecommerce service provider generating the account, the ecommerce service provider can cause the web page to be presented via a network, such as the Internet. That is, the ecommerce service provider can activate the web page so that customers can purchase items from the merchant via the web page (e.g., ecommerce). If the merchant has an account with the ecommerce service provider, the resulting images can be added to an existing web page or, can be integrated into additional or alternative content items to be presented via additional or alternative ecommerce channels.

Techniques described herein can be useful for various technical and business purposes. For instance, as described above, product imagery is important for ecommerce platforms. Professional-looking product images are important for establishing trust with potential customers. Many merchants do not have the skills or equipment necessary to capture professional-looking product images. Additionally or alternatively, many merchants do not have the time or attention to dedicate to product imagery as they are focused on managing other aspects of their business. Techniques described herein enable merchants to obtain high-quality, professional-looking images without having to acquire the skills and/or equipment necessary to otherwise take professional-looking product images. Further, by outsourcing image capturing, merchants can focus on other aspects of their businesses. That is, techniques described herein enable merchants to obtain high-quality, professional-looking photos that can be integrated into ecommerce content that can offer items for sale for the merchants. Such access to high-quality, professional-looking images can lend credibility to merchants, strengthen trust between merchants and customers, and can help merchants drive business (e.g., increase profits).

Furthermore, techniques described herein can offer additional benefits. With the introduction of ecommerce selling platforms, customers are no longer able to touch, feel, or interact with the items they are purchasing before they purchase the items. That is, customers cannot assess quality and/or try on items for sizing and/or fit. As such, ecommerce selling platforms experience much higher return rates than brick-and-mortar sellers. Returns are frustrating and can cause various inefficiencies in ecommerce transactions.

Images on ecommerce web pages, or other ecommerce platforms, enable customers to see what they are purchasing and can be instrumental in the decision-making process. The quality of images on such ecommerce web pages, or other ecommerce platforms, however, can either help or harm the decision-making process. For instance, multiple, high-quality images that show multiple, different angles of a product can enhance the decision-making process. Additionally, image resolution can affect the decision-making process. Techniques described herein can utilize a network-based merchant environment to observe characteristics associated with images associated with ecommerce content presented via ecommerce channels that are associated with performance metrics that satisfy thresholds. That is, characteristics of successful images and/or ecommerce content presenting such images can be used to inform the ecommerce service provider and/or merchants how to capture images that are also likely to drive performance metrics. As will be described below, techniques described herein enable access to images and/or ecommerce content of a plurality of merchants (e.g., different, disparately located merchants) that can be used to intelligently inform other merchants (or the ecommerce service provider) in a more personalized manner (versus the conventional one-size-fits-all techniques).

High-quality, professional-looking images help prevent returns and enable ecommerce merchants to more efficiently move transactions through payment flows. By mitigating returns, techniques described herein help alleviate additional logistic concerns that arise from ecommerce returns. Furthermore, by mitigating returns, computational systems hosting ecommerce services receive fewer return requests and thus reduce compute required for processing such return requests and/or network resources associated with transmission of such return requests. As such, techniques described herein offer improvements to existing technical environments.

Moreover, as described above, techniques described herein can streamline onboarding processes for onboarding new users to an ecommerce service provider. In some examples, a merchant can use the image capturing services available via the ecommerce service provider without having an account with the ecommerce service provider. In such examples, the ecommerce service provider can generate image(s) for the merchant and, when providing the image(s) to the merchant, can additionally provide content item(s) generated based on the resulting image(s). That is, in some examples, the ecommerce service provider can automatically create content item(s) for merchants (or potential merchants) to attract different types of merchants and/or promote diversification of ecommerce channel presence for other merchants. Techniques described herein, therefore, are directed to improvements in the technical field of onboarding, which can often require multiple steps (and thus points of friction). In at least one example, techniques described herein can reduce onboarding to the submission of an item for image capturing services and/or the submission of an image of an item, which can cause the auto-generation of a content item. If the submitting merchant claims the generated content item, the ecommerce service provider can onboard the merchant without further input required by the merchant (in at least some examples). Additional technical improvements are described below in the discussion of FIGS. 1-15.

While the disclosure herein is directed to "images," techniques described herein can similarly be applicable to other types of data including, but not limited to, video, audio, etc.

FIG. 1 illustrates an example environment 100 for performing techniques described herein. The example environment 100 includes server computing device(s) 102 that communicate with a merchant computing device 104, a photographer courier computing device 106, and/or an image capturing device 108, for instance, via a network 109. While only a single merchant computing device, single photographer courier computing device, and single image capturing device are illustrated in FIG. 1, in a practical application of techniques described herein, there can be multiple merchant computing devices, photographer courier computing devices, and image capturing devices. Additional details associated with each of the devices and the network are described below with reference to FIGS. 14 and 15.

In at least one example, the server computing device(s) 102 can be associated with an ecommerce service provider that provides, among other services described below, image capturing services, content creation services, web page hosting services, and so on. In some examples, the server computing device(s) 102 can additionally be associated with a payment processing service provider that provides, among other services described below, payment processing services. In at least one example, the server computing device(s) 102 can include one or more functional components that are executable by processors to enable the server computing device(s) 102 to perform actions and services attributed to the server computing device(s) 102. In at least one example, those functional components can include, but are not limited to, a content module 110, an onboarding module 112, a courier management module 114, and a payment processing module 116. Furthermore, the server computing device(s) 102 can store, or otherwise access, a database 118 or other data repository (e.g., locally, remotely, etc.), which can include profile(s) 119 and/or image(s) 120. In at least one example, actions attributed to the ecommerce service provider and/or payment processing service provider can be performed, at least in part by the server computing device(s) 102. In some examples, actions attributed to the ecommerce service provider and/or payment processing service provider can be performed, at least in part by an agent or other user working on behalf of the ecommerce service provider and/or payment processing service provider.

The content module 110 can, among other things, facilitate the generation, receipt, and/or analysis of images. Further, the content module 110 can generate, edit, and/or maintain content items, which can be output via one or more ecommerce channels. As described above, content items can be items of content, which can include, but are not limited to a social media post, a digital marketing item, an email, a message, a web page, a marketplace post, and so on. Content items can present images, as described herein, via one or more ecommerce channels. Additional details are described below.

The onboarding module 112 can, among other things, facilitate onboarding new merchants (or other users) to the ecommerce service provider. In some examples, onboarding can involve presenting various questions, prompts, and the like to a potential merchant to obtain information that can be used to (i) verify the identity of the potential merchant and/or (ii) generate a profile for the potential merchant. Responsive to the merchant providing necessary information, the onboarding module 112 can onboard the merchant to the ecommerce service provider. That is, the onboarding module can generate a profile for the potential merchant and/or associate an account with an existing merchant profile so that the merchant can access services associated with the ecommerce service provider. Additional details are described below.

The courier management module 114 can, among other things, facilitate automatically selecting a photographer courier 126 for fulfilling a request from a merchant (or the ecommerce service provider) and/or automatically attempting to assign the request to the photographer courier 126. In an example, a request can be submitted by a merchant 122 and/or the ecommerce service provider. In some examples, the request can be for image capturing services. In other examples, the request can be for transporting an item from its current location to another location (e.g., for image capturing services). In at least one example, the courier management module 114 can receive a request from the merchant 122 (e.g., from the merchant computing device 104 associated therewith). The courier management module 114 can, upon receiving the request from the merchant computing device 104, evaluate photographer couriers to make a determination on a "best" (e.g., a best option, a top choice, a first choice, etc.) photographer courier to fulfill the request to the merchant 122. As will be described in additional detail below, the courier management module 114 can determine a fulfillment plan for instructing a photographer courier 126 to fulfill the request (and, in some examples, one or more other requests). For instance, the instructions corresponding to a particular request can include traveling to the merchant 122, picking up an item to be photographed, traveling to a location associated with the ecommerce service provider from where an image of the item can be captured, and delivering the item at the location. Such instructions can be dispatched to the photographer courier 126 via the courier user interface 128. Additional details are described below.

The payment processing module 116 can, among other things, receive payment data associated with transactions between merchants and customers and can transmit requests (e.g., authorization, capture, settlement, etc.) to a payment service provider to process the payment data as payment for the transactions. The payment processing module 116 can communicate the successes or failures of the transactions to the merchant computing device 104. Additional details are described below.

As described below in additional detail, the profile(s) 119 can be stored in a database 118. The profile(s) 119 can store user profiles, which can include merchant profiles, customer profiles, courier profiles, and so on. In at least one example, a profile can be associated with one or more accounts, which can correspond to one or more different service providers and/or different services of the same service provider.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store, or otherwise be associated with, customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

Courier profiles can store, or otherwise be associated with, courier data including, but not limited to, current and/or past information related to the couriers. For example, the courier information can include location information, which can include a location of the photographer courier when information associated with a request is provided to the photographer courier. Further, the courier information can include delivery times, which can indicate how long it took each photographer courier to arrive at a particular location (e.g., pickup location, merchant location, location associated with the ecommerce service provider, etc.) after receiving the request, and distances traveled, which can indicate how far each courier had to travel to arrive at a particular location and/or to make delivery of an item. In addition, the courier information can include wait times, which can indicate how long each photographer courier had to wait after responding to a request before receiving another request. In some examples, courier information can indicate whether a photographer courier is active or inactive, equipment associated with a photographer courier, expertise or a skill set of a photographer courier, and so on.

In at least one example, the database 118 can additionally store image(s) 120. In some examples, the image(s) 120 can be stock images, which can include images licensed for specific use (e.g., by the ecommerce service provider to provide to merchants, such as the merchant 122, for generating web pages or other ecommerce content items). In some examples, the owners of the image(s) 120 (e.g., the copyright associated therewith) can be third-parties that are not using services of the ecommerce service provider. In additional or alternative examples, at least some of the image(s) 120 can be owned by merchants, such as the merchant 122, that are using the services of the ecommerce service provider. In such examples, the ecommerce service provider can offer incentives (e.g., discounts, complimentary services, etc.) for merchants who add their images to the image(s) 120 in the database. In some examples, such image(s) 120 can be subject to one or more restrictions regarding use. For instance, such image(s) 120 may not be useable by merchants in the same vertical (e.g., MCC) as the contributing merchant, merchants in the same geolocation as the contributing merchant, more than a specified number of times, longer than a specified length of time, and so on. In some examples, the image(s) 120 can be used for training models, as described herein.

In at least one example, the merchant computing device 104 can present user interface(s) that enable a merchant, such as merchant 122, to interact with the merchant computing device 104. The ecommerce user interface 124 is an example of such a user interface. In at least one example, the ecommerce user interface 124 can be presented via a web browser, or the like. In other examples, the ecommerce user interface 124 can be presented via an application, such as a mobile application or desktop application, which can be provided by the ecommerce service provider, or which can be an otherwise dedicated application. In at least one example, the merchant 122 can interact with the ecommerce user interface 124 via touch input, spoken input, or any other type of input.

The photographer courier computing device 106 can be operable by a user referred to as "photographer couriers" throughout this disclosure. Photographer couriers, such as the photographer courier 126, can be users who can travel to, for example, locations of merchants, such as the merchant 122, and/or locations associated with the ecommerce service provider. In some examples, the photographer courier 126 can receive compensation from the ecommerce service provider. The photographer courier 126 can employ one or more vehicles 127, such as automobiles, bicycles, scooters, motorcycles, buses, airplanes, helicopters, boats, skateboards, etc. Although, in other instances the photographer courier 126 can travel by foot or otherwise without a vehicle. Some examples discussed herein enable people to participate as photographer couriers in a type of crowdsourced service economy. Here, essentially any person with a mobile device is able to immediately become a photographer courier 126, or cease to be a photographer courier 126, in a photographer courier network that provides services as described herein. In at least one example, the photographer couriers can be unmanned aerial vehicles (e.g., drones), autonomous vehicles, or any other type of vehicle capable of receiving instructions for traveling between locations.

In some examples, the photographer couriers, such as the photographer courier 126, can receive dispatch instructions via an instance of a courier user interface 128 presented via a corresponding photographer courier computing device. In at least one example, the courier user interface 128 can be presented via a web browser, or the like. In other examples, the courier user interface 128 can be presented via an application, such as a mobile application or desktop application, which can be provided by the ecommerce service provider, or which can be an otherwise dedicated application. In at least one example, the photographer courier 126 can interact with the courier user interface 128 via touch input, spoken input, or any other type of input. In some examples, the photographic courier 126 can travel with image capturing equipment for performing image capturing services on location. In additional or alternative examples, the photographic courier 126 may not travel with image capturing equipment and can transport items between locations to facilitate image capturing services.

In at least one example, the example environment 100 can include the image capturing device 108, as described above. In some examples, the image capturing device 108 can be integrated into individual of the computing devices described above, such as the server computing device(s) 102, the merchant computing device 104, and/or the photographer courier computing device 106. That is, in such examples, the server computing device(s) 102, the merchant computing device 104, and/or the photographer courier computing device 106 can have an image capturing device 108 integrated into the individual computing devices, which can exchange data with other local functional components. In additional or alternative examples, the image capturing device 108 can be remotely located from the server computing device(s) 102, the merchant computing device 104, and/or the photographer courier computing device 106, as illustrated in FIG. 1. In such examples, the image capturing device 108 can exchange data with the server computing device(s) 102, the merchant computing device 104, and/or the photographer courier computing device 106 via one or more network connections.

In at least one example, users (e.g., users performing actions on behalf of the ecommerce service provider, the merchant 122, the photographic courier 126, etc.) can interact with the image capturing device 108 via the image capturing user interface 130. In at least one example, the image capturing user interface 130 can be presented via a web browser, or the like. In other examples, the image capturing user interface 130 can be presented via an application, such as a mobile application or desktop application, which can be provided by the ecommerce service provider, or which can be an otherwise dedicated application. In at least one example, a user can interact with the image capturing user interface 130 via touch input, spoken input, or any other type of input.

In at least one example, the image capturing device 108 can be a photo robot (e.g., KIRA® by MOTORIZED PRECISION®, AUTOCAM360™ by KESSLER CRANE®, etc.), which can be an automated system that enables users to capture and create images (which can be two-dimensional (2D), three-dimensional (3D), still, live, and so on). Such a photo robot can provide multi-angle views, camera position control (e.g., rotation, tilt, horizontal and/or vertical movement), remote camera control (e.g., aperture, ISO, shutter speed, white balance, exposure compensation, focus magnification, other camera settings, etc.), lighting control (e.g., dimming, color temperature, saturation, etc.), focus and zoom control (e.g., for adjusting focus and focal length), and so on. In some examples, the photo robot can manipulate views, camera position control (e.g., rotation, tilt, horizontal and/or vertical movement), camera control (e.g., aperture, ISO, shutter speed, white balance, exposure compensation, focus magnification, other camera settings, etc.), lighting control (e.g., dimming, color temperature, saturation, etc.), focus and zoom control (e.g., for adjusting focus and focal length), and so on responsive to receiving computer-executable instructions and without user input. In additional or alternative examples, the photo robot can manipulate views, camera position control (e.g., rotation, tilt, horizontal and/or vertical movement), camera control (e.g., aperture, ISO, shutter speed, white balance, exposure compensation, focus magnification, other camera settings, etc.), lighting control (e.g., dimming, color temperature, saturation, etc.), focus and zoom control (e.g., for adjusting focus and focal length), and so on responsive to receiving computer-executable instructions and/or based on user input.

In some examples, the photo robot can additionally associate meta data with resulting images. In at least one example, such meta data can be automatically determined (e.g., without user input). In other examples, a user can input meta data, which can be customizable, for instance, based on the preferences of the ecommerce service provider. Meta data can include, but is not limited to, description, weight, dimensions, SKU #, UPC/GTIN, etc.

In additional or alternative examples, the image capturing device 108 can be any other type of computerized device that is capable of capturing images. In some examples, individual of the user interfaces (e.g., the ecommerce user interface 124 and/or the courier user interface 128) can include image capturing mechanisms. For instance, developers can leverage an application programming interface (API) so that a user can access image capturing (e.g., camera) functionality without the user exiting the application. As illustrated in the example environment 100, the ecommerce user interface 124 includes an integrated image capturing mechanism 132 and the courier user interface 128 includes an integrated image capturing mechanism 134.

As described herein, a "merchant" can be any entity that offers items (e.g., goods or services) for purchase or other means of acquisition (e.g., rent, borrow, barter, etc.). The merchant 122 can offer items for purchase or other means of acquisition via brick-and-mortar stores, mobile stores (e.g., pop-up shops, food trucks, etc.), online stores ("ecommerce"), combinations of the foregoing, and so forth. In the non-limiting example illustrated in FIG. 1, the merchant 122 can have a business called "OOOOODonuts," where the merchant 122 sells donuts and merchandise ("merch") related to the donuts. That is, the merchant's inventory 136 includes donuts and merchandise. The merchant 122 can sell its inventory 136 via an ecommerce web page 138 (in addition to, or as an alternative of, a brick-and-mortar store). An ecommerce web page, such as the ecommerce web page 138 can be a web page (e.g., a document containing text, graphics, hyperlinks, etc., which is accessible through a network by a web browser) that is associated with a payment processing service provider through which customers can purchase, or otherwise acquire, items offered for sale by merchants, such as the merchant 122. A web page can be "associated with" a payment processing service provider such that the web page includes a mechanism through which secure payment information can be received and transmitted to the payment processing service provider (e.g., the payment processing module 116) for processing transactions.

In an example, the merchant 122 can want to capture high-quality images of its donuts and/or merchandise to add to the web page 138 of the merchant 122. In such an example, the merchant 122 has several options as described above: (i) send, or otherwise provide, the donuts and/or merchandise to a location of the ecommerce service provider (FIG. 2), (ii) utilize guidance offered by the ecommerce service provider to capture images of the donuts and/or merchandise (e.g., via the ecommerce user interface 124) (FIG. 3), and/or (iii) request a photographer courier (e.g., the photographer courier 126) to capture images of the donuts and/or merchandise or to transport the donuts and/or merchandise to a location of the ecommerce service provider (FIG. 4). In some examples, the merchant 122 can forego all of the options above and can submit their own image (e.g., having not used the guidance, for example). In any of the examples above, the resulting images can be provided to the content module 110 for, in some examples, further analysis and/or integration into the web page 138 of the merchant 122 (e.g., if the web page 138 is hosted by the ecommerce service provider). Additional details are described below.

Figure 2:
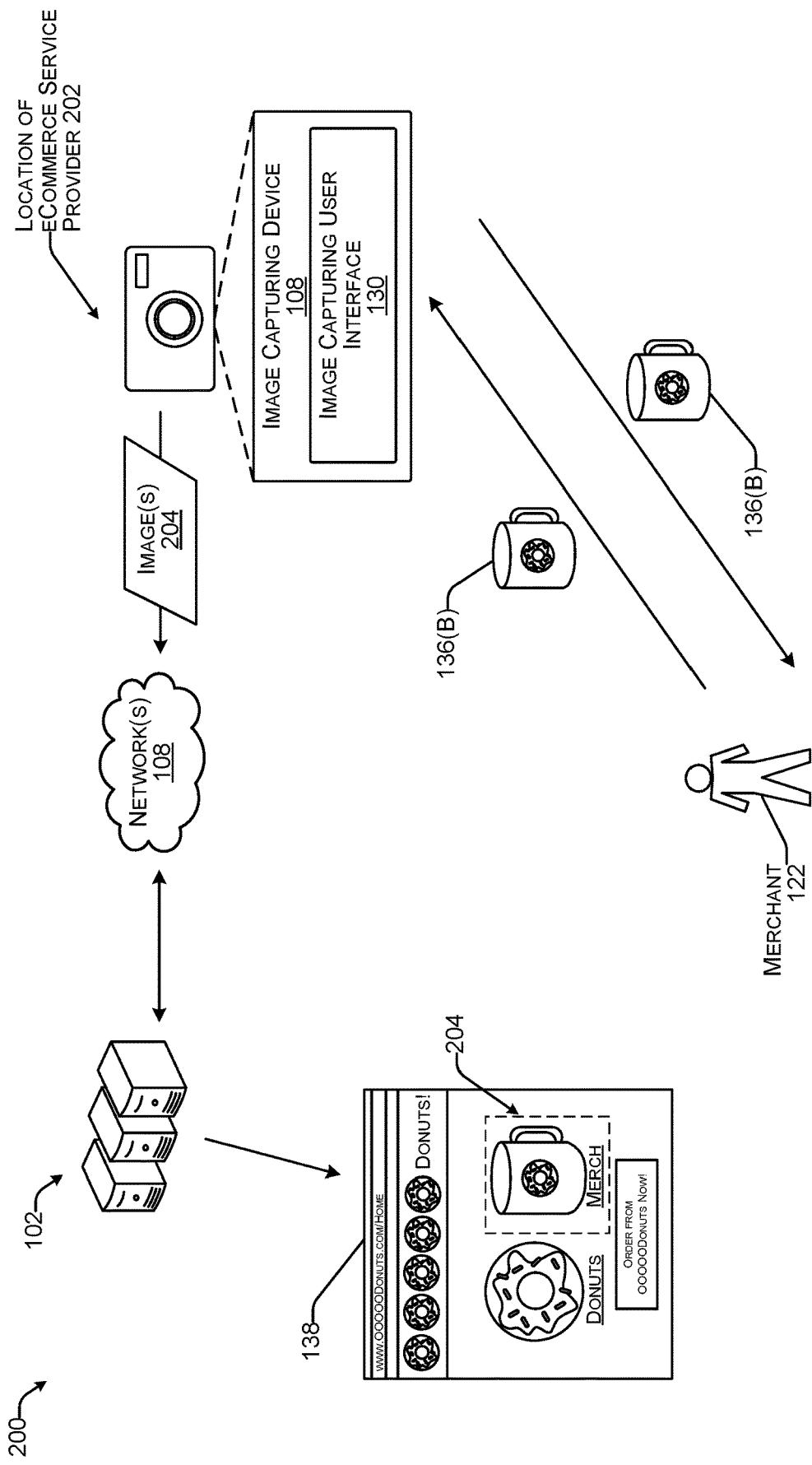
FIG. 2 illustrates an example environment for performing techniques described herein.
Figure 3:
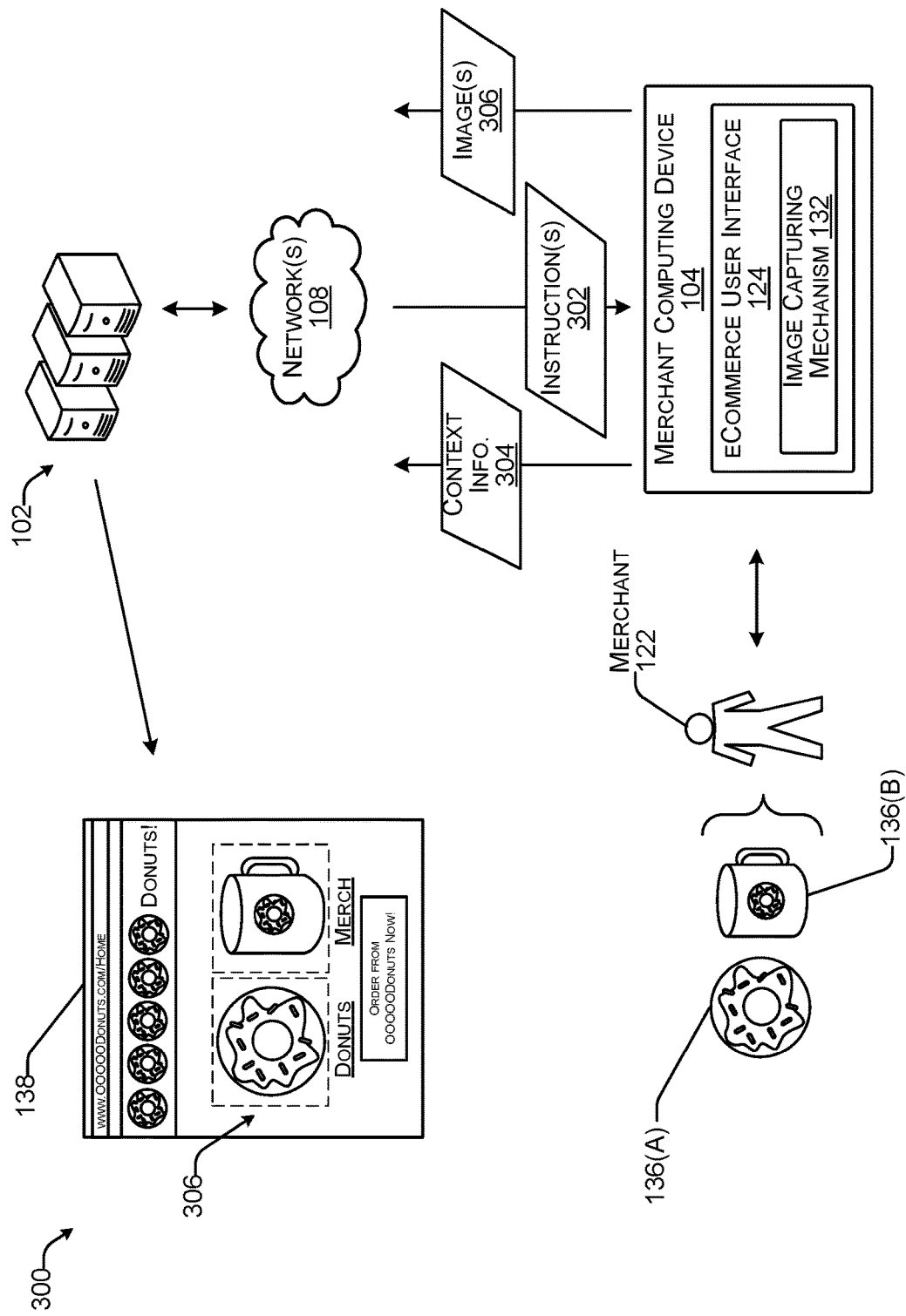
FIG. 3 illustrates an example environment for performing techniques described herein.
Figure 4:
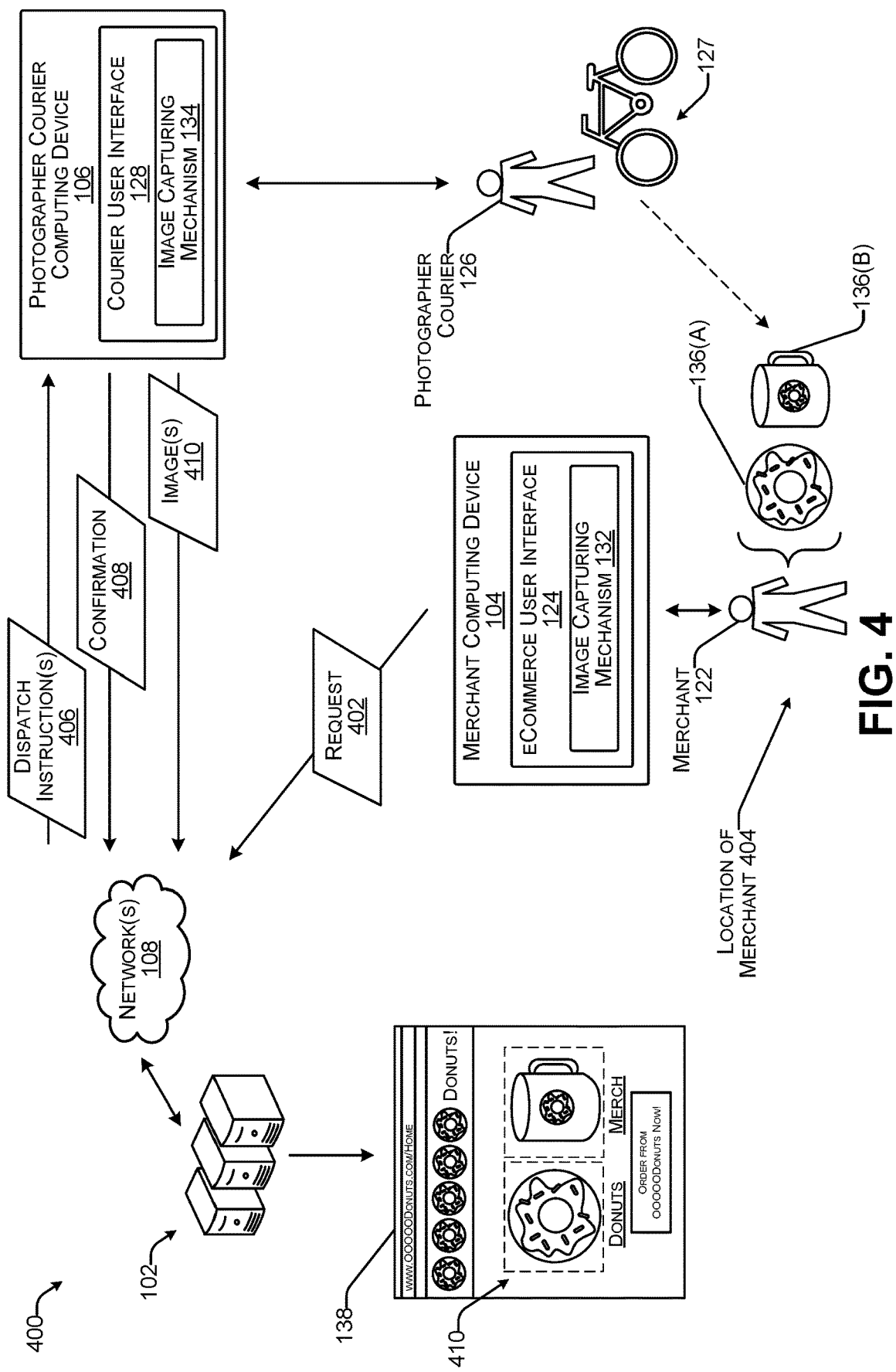
FIG. 4 illustrates an example environment for performing techniques described herein.

FIGS. 2-4 illustrate example environments for implementing the options described above. FIGS. 2-4 incorporate entities described above with reference to FIG. 1; however, some entities are omitted in each of FIGS. 2-4 to ease understanding.

As described above, if the merchant 122 desires to capture high-quality images of its donuts and/or merchandise, the merchant 122 can send, or otherwise provide, the donuts and/or merchandise to a location of the ecommerce service provider, as illustrated in FIG. 2. FIG. 2 illustrates an example environment 200 for performing techniques described herein. In FIG. 2, the merchant 122 can ship, or otherwise provide, at least a portion of its inventory 136 (e.g., a coffee cup 136(B)) to a location of the ecommerce service provider 202. In FIG. 2, the image capturing device 108 can be located at the location of the ecommerce service provider 202, which can be a physical location where merchants ship items for image capturing services.

While a single image capturing device 108 is illustrated in a single location of the ecommerce service provider 202, in additional or alternative examples, the ecommerce service provider can have multiple locations where one or more image capturing devices are located. In such examples, the server computing device(s) 102 can determine logistics for instructing merchants where to send their items based at least in part on item type, geolocation, backlog (e.g., how many items are in a queue for image capturing at a particular location), and so on. That is, responsive to receiving a request for image processing services, the server computing device(s) 102 (e.g., the content module 110) can determine which location the requesting merchant should ship, or otherwise provide, an item. In such an example, the server computing device(s) 102 can make such a determination based at least in part on item type, geolocation, backlog, and so on. As an example, the server computing device(s) 102 can instruct a merchant to send a first item type (e.g., jewelry) to a first location of the ecommerce service provider and a second item type (e.g., candles) to a second location of the ecommerce service provider. Additionally or alternatively, the server computing device(s) 102 can instruct a first merchant to send an item to a first location of the ecommerce service provider and a second merchant to send an item to a second location of the ecommerce service provider, for example, based on the geolocations of the first and second merchant.

Such logistics can assist with scheduling image capturing services and streamlining workflow. In some examples, such logistics determinations can enable the ecommerce service provider to batch similar items together, which in turn can streamline image capturing workflow. For example, such logistics can enable an image capturing device at a particular location to be set to settings for a particular item type for a batch of similar items. This can reduce the need to re-set settings for each item that is sent for image processing services, thereby expediting the rate at which images can be captured via the image capturing device 108. That is, inventory mix is problematic from an efficiency perspective (e.g., requires reconfiguration of settings for different types of inventory) and thus, the logistics and scheduling described above offer a solution to this problem.

The image capturing device 108 at the location of the ecommerce service provider 202 can capture image(s) 204 of the coffee cup 136(B), for example. In some examples, the merchant 122 can provide instructional image(s) and/or other instruction for capturing image(s) of the item (e.g., the coffee cup 136(B)). That is, in some examples, the merchant 122 can send one or more images to the server computing device(s) 102 to cue the image capturing device 108 for capturing additional images of the item (e.g., the coffee cup 136(B)). Further, in some examples, the ecommerce service provider can have templates of instructions for capturing images of different item types, for different merchants, and so on. Such templates can be informed based at least in part on a plurality of images and associated performance metrics, quality scores, and so on. In at least one example, the templates can be associated with computer-executable instructions such that the computer-executable instructions can be provided to the image capturing device 108 and executed by the image capturing device 108 without input or assistance from a user of the image capturing device 108. In additional or alternative examples, the templates can be associated with instructions that are presented to a user of the image capturing device 108 (e.g., via the image capturing user interface 130) for guiding the user through capturing image(s) of an item, such as the coffee cup 136(B).

The image capturing device 108 can capture the image(s) 204 of the item (e.g., the coffee cup 136(B)) and send the image(s) 204 to the server computing device(s) 102. In some examples, the image capturing device 108 can perform one or more post-processing techniques on the image(s) 204. For instance, in some examples, the image capturing device 108 can remove background color(s), apply filter(s), and/or perform other post-processing techniques on the image(s) 204 prior to sending the image(s) 204 to the server computing device(s) 102. In additional or alternative examples, the server computing device(s) 102 can perform such post-processing technique(s) after receiving the image(s) from the image capturing device 108.

In at least one example, the server computing device(s) 102 (e.g., the content module 110) can evaluate the image(s) 204, as described below, and can integrate the image(s) 204 into the web page 138 (or other content item) of the merchant 122. In some examples, if the merchant 122 has a content item that is available via an existing ecommerce channel, such as the web page 138, the server computing device(s) 102 (e.g., the content module 110) can integrate the image(s) 204 into the existing content item and/or generate a new content item for availing via an additional or alternative ecommerce channel (e.g., a social media post, a digital marketing item, a marketplace post, etc.). In some examples, the server computing device(s) 102 (e.g., the content module 110) can recommend the new ecommerce channel to the merchant 122 and, in some examples, can recommend when and where to post, or otherwise avail, the new content item for optimal performance. Furthermore, in some examples, the server computing device(s) 102 (e.g., the content module 110) can access content items on existing ecommerce channels and use information associated with such existing content items for generating the new content items.

After the image(s) 204 of the item (e.g., the coffee cup 136(B)) have been captured, the ecommerce service provider can ship, or otherwise provide, the item back to the merchant 122. In some examples, the ecommerce service provider can analyze the shipping techniques (e.g., method, products, packaging, etc.) to determine whether the current shipping techniques are optimal for the item. In the example where the ecommerce service provider determines that the shipping can be optimized (e.g., improved packaging, etc.), the ecommerce service provider can package the item and ship the item back to the merchant 122 based on the optimized shipping determination. In at least one example, the shipping techniques associated with the optimized shipping determination can be set as default shipping techniques for shipping the item (e.g., to customers). That is, in some examples, the ecommerce service provider can make fulfillment recommendations based at least in part on interacting with items for providing image capturing services.

While FIG. 2 is directed to an example where the merchant 122 ships, or otherwise provides, an item to a physical location of the ecommerce service provider 202, not all items can be shipped, or otherwise provided, to the physical location of the ecommerce service provider 202 (at least not practically) or the physical location of the ecommerce service provider 202 may not be able to store certain items even if they are capable of being shipped, or otherwise provided, to the physical location of the ecommerce service provider 202. For instance, perishable items (e.g., the donut 136(A)) may not be shipped (or otherwise provided) to and/or stored by the physical location of the ecommerce service provider 202 due to their limited shelf-life. Or, in another example, a car, boat, or other large-sized item may not be shipped (or otherwise provided) to and/or stored by the physical location of the ecommerce service provider 202.

In some examples, the server computing device(s) 102 (e.g., the content module 110) can receive an instructional image or other indicator prior to the merchant 122 shipping, or otherwise providing, an item that cannot be shipped (or otherwise provided) to and/or stored by the physical location of the ecommerce service provider 202. In at least one example, the server computing device(s) 102 (e.g., the content module 110) can perform image processing or utilize other computer vision techniques to detect the item (e.g., in an instructional image) and can provide an alternative option to the merchant 122 (e.g., photographer courier services, etc.).

FIG. 3 illustrates an example environment 300 for performing techniques described herein. In an example, as described above, the merchant 122 can utilize guidance offered by the ecommerce service provider to capture images of the donuts 136(A) and/or merchandise 136(B) (e.g., via the ecommerce user interface 124). In at least one example, the server computing device(s) 102 can provide the ecommerce user interface 124 with instruction(s) 302 for guiding the merchant 122 through capturing images of item(s). In such an example, the instruction(s) 302 can be provided in near-real-time to guide the merchant 122 through capturing different views of an item, different features of an item, in different lighting, with different focuses, different backgrounds, and so on. In at least one example, the ecommerce user interface 124 can receive information from sensors and/or other input/output devices associated with the merchant computing device 104 and can determine context information 304 associated with the environment within which the item(s) are positioned. In some examples, such context information 304 can be provided to the server computing device(s) 102 to determine the instruction(s) 302. In additional or alternative examples, the ecommerce user interface 124 can additionally access an image of an item, as perceived through the image capturing mechanism 132 (or another image capturing device). In some examples, the image, or features associated therewith, can be used to determine context information 304, which can be provided to the server computing device 102 for determining the instruction(s) 302. In at least one example, the instruction(s) 302 can prompt the merchant 122 to modify at least one of a position of the item and/or the merchant computing device 104, a characteristic of the environment (e.g., lighting, background, etc.), a setting of the image capturing mechanism 132, and so on. The image capturing mechanism 132 can capture image(s) 306, which can be provided to the server computing device(s) 102 (e.g., the content module 110). The server computing device(s) 102 (e.g., the content module 110) can evaluate the image(s) 306, as described below, and can integrate the image(s) 306 into the web page 138 (or other content item) of the merchant 122.

In some examples, the ecommerce user interface 124 can be associated with functionality to analyze context information 304 and generate the instruction(s) 302 locally, without transmitting the context information 304 to the server computing device(s) 102 to receive the instruction(s) 302. For instance, if the ecommerce user interface 124 is presented via an application, the application can have instructions that are executable to analyze context information 304 and generate the instruction(s) 302 locally.

In at least one example, the instruction(s) 302 can be determined based on performance metric(s) and/or quality score(s), as described below. In at least one example, the instruction(s) 302 can be output from a machine-trained model, in near-real-time to guide the merchant 122 through capturing different views of an item, different features of an item, in different lighting, with different focuses, different backgrounds, and so on. In some examples, the instruction(s) 302 can be output via augmented reality, spoken output, haptic output, or any other output to convey the instruction(s) 302 to the merchant 122.

FIG. 4 illustrates an example environment 400 for performing techniques described herein. In at least one example, as described above, the merchant 122 can request a photographer courier (e.g., the photographer courier 126) to capture images of the donuts and/or merchandise or to transport the donuts and/or merchandise to a location of the ecommerce service provider.

As described above, some examples herein describe techniques and arrangements for automatically selecting a photographer courier, such as the photographer courier 126, for fulfilling a request from a merchant and/or automatically attempting to assign the request to the photographer courier 126. In many instances, the server computing device(s) 102 can communicate with the photographer courier computing device 106 to cause the photographer courier computing device 106 to fulfill requests from merchants. To do so, locations of merchants and/or photographer couriers can be determined by a global positioning system (GPS) receiver or other location sensor onboard the merchant computing device 104 or the photographer courier computing device(s). This location information can be transmitted to the server computing device(s) 102 and used to provide notifications to facilitate fulfillment of requests and/or perform other processing. As such, the technology herein can employ a plurality of computing devices, mobile devices, and/or location sensors in a novel technological arrangement to automatically dispatch photographer couriers.

As used herein, a request 402 can include a request submitted by a merchant, such as the merchant 122, for a photographer courier, such as the photographer courier 126, to travel to a location of the merchant 404 to capture images of item(s) of the merchant 122 and/or to pick-up item(s) and transport the item(s) to a location of the ecommerce service provider for image capturing services to be performed, for example. In some examples, the request 402 can be associated with a time, a location, a service, etc. The request 402 can be received by the courier management module 114, e.g., via an SMS text message, voice mail, telephone call, in-app message, etc. An undispatched request can include a request received by the courier management module 114 that has not yet been assigned to, or otherwise associated with, a photographer courier. The courier management module 114 can receive payment from the merchant 122 for services associated with the request 402 and the courier management module 114 can provide payment to the selected photographer courier for fulfilling the request 402.

In at least one example, the courier management module 114 can receive the request 402 from the merchant 122. The request 402 can be a request for a photographer courier to travel to a location of the merchant 404 to capture images of item(s) of the merchant 122 and/or to pick-up item(s) and transport the item(s) to a location of the ecommerce service provider for image capturing services to be performed. The courier management module 114 can, upon receiving the request from the merchant computing device 104, evaluate photographer couriers to make a determination of a "best" (e.g., a best option, a top choice, a first choice, etc.) photographer courier to fulfill the request. For convenience, the term "fulfill the request," or the like, can be used herein instead of the term "travel to a location of the merchant 404 to capture images of item(s) of the merchant 122 and/or to pick-up item(s) and transport the item(s) to a location of the ecommerce service provider for image capturing services to be performed," or the like.

In some examples, the courier management module 114 can evaluate active photographer couriers, i.e., photographer couriers that are capable of receiving request assignments from the courier management module 114 during a time period in which the photographer courier evaluation occurs. In some cases, photographer couriers can be associated with respective photographer courier computing device 106, as described above. Respective instances of a courier user interface 128 can enable photographer couriers to interact with the photographer courier computing device 106 and/or the ecommerce service provider. When a photographer courier wants to be considered for request assignments, the photographer courier can indicate, via the courier user interface 128, that they are active (e.g., sign-on to an application, log-in to a web page, etc.). In some examples, the status of a photographer courier (e.g., active, inactive, etc.) can be associated with a courier profile of the profile(s) 119, described above. Accordingly, the courier management module 114 can identify active photographer couriers for evaluating.

The courier management module 114 can determine, for each photographer courier being evaluated, a first fulfillment plan and a second fulfillment plan, where the first fulfillment plan considers requests that are currently assigned to a photographer courier, and the second fulfillment plan considers, in addition to the currently assigned requests, the request 402 received from the merchant computing device 104. In some instances, the first fulfillment plan can be based on a set of remaining operations that the photographer courier has yet to perform for the currently assigned requests. The second fulfillment plan can be based on the set of remaining operations and a set of additional operations that the photographer courier would perform for the request 402 received from the merchant computing device 104.

A photographer courier's fulfillment plan can include operations that the photographer courier follows to finish fulfillment of all assigned requests. For instance, the operations corresponding to a particular request can include traveling to a merchant and performing image capturing services. Or, the operations corresponding to a particular request can include traveling to a merchant, picking up an item, traveling to a location of the ecommerce service provider, and delivering the item to the location of the ecommerce service provider. The number of remaining operations for fulfillment of a particular request can be vary based on the current status of a request. For example, the photographer courier can have completed the operation of picking up an item from a merchant associated with a first request and the current status of the first request can be considered "out for delivery." Therefore, there can be two remaining operations for fulfillment of the first request—traveling to a location of the ecommerce service provider and delivering the item to the location of the ecommerce service provider. The photographer courier can also be assigned a second request. If the photographer courier has not yet started the operation of traveling to the merchant, then there can be four remaining operations for delivery of the second request—traveling to a merchant, picking up an item, traveling to a location of the ecommerce service provider, and delivering the item to the location of the ecommerce service provider.

In some cases, the first fulfillment plan can be one of multiple possible fulfillment plans for the set of remaining operations. Each possible fulfillment plan can include a valid traverse path of the set of remaining operations. The courier management module 114 can consider constraints on transitions between operations of the set of remaining operations. For example, within each request, the operation corresponding to traveling to the merchant can transition to the operation corresponding to picking up an item from the merchant. Additionally or alternatively, across all requests, the operation corresponding to fulfilling the request can transition to any other request's operations. That is, after completing an operation corresponding to delivering a first request, the photographer courier can start or resume operations of a second request. These constraints on transitions can be used to model batched fulfillment options. For example, if a first request and a second request are to be provided by proximate merchants, then it is possible for the photographer courier to fulfill the first request and the second request from the back to back.

The courier management module 114 can use an evaluation formula to evaluate the possible traverse paths of the set of remaining operations that a photographer courier has yet to perform for currently assigned requests. In some cases, the evaluation formula can be designed to minimize overall response time and/or minimize photographer courier travel efforts. The evaluation formula can account for various characteristics, such as characteristics pertaining to operations constraints and/or business constraints. The courier management module 114 can use the evaluation formula to score at least a portion of a traverse path. For instance, individual operations and/or transitions between operations can be assigned one or more scores based on desirable (or otherwise preferred) and/or undesirable (or otherwise non-preferred) characteristics. In some cases, desirable characteristics that are present in the operations and/or the transitions between operations can be assigned a positive score, while undesirable characteristics can be assigned a negative score, or vice-versa. The characteristics can be weighted. Desirable characteristics can include, but are not limited to, short travel times, short travel distances, batched requests, photographer couriers who have few remaining operations, scheduled photographer couriers, photographer couriers with high quality scores, photographer couriers with particular equipment, photographer couriers with particular expertise, photographer couriers who are not busy, etc. Undesirable characteristics can include, but are not limited to, long travel times, long travel distances, late photographer courier arrivals to merchants, unbatched requests, photographer couriers who have many remaining operations, unscheduled photographer couriers, photographer couriers with low quality scores, photographer couriers with particular equipment (or lack thereof), photographer couriers with particular expertise (or lack thereof), photographer couriers who are busy, etc.

Furthermore, the evaluation formula can account for one or more characteristics pertaining to the vehicle(s) the photographer courier will use. For a biker, the evaluation formula can consider one or more characteristics pertaining to whether the biker has exceeded, or will exceed, a maximum travel distance. For instance, the maximum travel distance for the biker can be based on a specific geographic region (e.g., a city). In addition, the evaluation formula can consider one or more characteristics pertaining to the types of items for which the biker will be performing image capturing services and/or transporting to another location. For instance, the evaluation formula can consider transport of certain types of items (e.g., perishable items, large items, etc.) by a biker as undesirable or restricted. Moreover, one or more characteristics pertaining to the carrying capacity of the biker can be considered by the evaluation formula. For a car driver, the evaluation formula can consider one or more characteristics pertaining to parking constraints can be considered. For instance, the evaluation formula can consider that certain merchants typically have limited or no onsite parking.

In some examples, the evaluation formula can account for one or more characteristics as they pertain to the request. For example, if the request is for image capturing services to be performed at the location of the merchant 404, the evaluation formula can consider whether a particular photographer courier has the proper image capturing equipment, the expertise of the photographer courier, etc.

In some examples, the first fulfillment plan can be the fulfillment plan with the highest score among multiple possible fulfillment plans. In some cases, the courier management module 114 can use a brute force algorithm to enumerate all traverse paths of the set of remaining operations and evaluate the traverse paths' respective scores one by one. Additionally or alternatively, the courier management module 114 can use an approximation algorithm to determine the first fulfillment plan. For instance, the server computing device(s) 102 can identify a Markov chain traverse path, in which the choice of a next operation only depends on its previous operation. As an example, suppose the courier management module 114 is determining a next operation to follow an operation corresponding to fulfilling a request. The courier management module 114, using a Markov algorithm, can evaluate the incremental score for each of the possible next operations, and greedily select the best one (e.g., the next operation with the highest incremental score).

As discussed above, the second fulfillment plan can be based on the set of remaining operations and the set of additional operations that the photographer courier would perform for the request 402. The courier management module 114 can use the evaluation formula discussed above, or the like, to evaluate and/or score the possible traverse paths of the set of remaining operations and the set of additional operations. In some examples, the second fulfillment plan can be the fulfillment plan with the highest score among multiple possible fulfillment plans. The courier management module 114 can use a brute force algorithm to enumerate all traverse paths of the set of remaining operations and the set of additional operations, and evaluate the traverse paths' respective scores one by one. Additionally or alternatively, the courier management module 114 can use an approximation algorithm (e.g., a Markov algorithm) to determine the second fulfillment plan.

In various examples, the courier management module 114 can calculate incremental effort scores that individually correspond to a respective photographer courier of the active photographer couriers. Calculation of an individual incremental effort score of a respective photographer courier can be based on the photographer courier's first fulfillment plan score and second fulfillment plan score. For instance, the courier management module 114 can calculate an incremental effort score for the photographer courier by subtracting the first fulfillment plan score from the second fulfillment plan score.

Furthermore, the courier management module 114 can rank the active photographer couriers according to the respective incremental effort scores. As an example, the courier management module 114 can calculate a first incremental effort score for a photographer courier and a second incremental effort score for a second photographer courier. The first incremental effort score can be determined to be lower than the second incremental effort score. The courier management module 114 can rank the photographer courier higher than the second photographer courier. In some cases, rather than ranking the photographer couriers from lowest incremental effort score to highest incremental effort score, the courier management module 114 can rank the photographer couriers from highest incremental effort score to lowest incremental effort score.

In some examples, the courier management module 114 can select a photographer courier based at least in part on the ranking of the active photographer couriers. The photographer courier can be a best, or first choice, photographer courier for fulfilling the request 402. In some cases, the selected photographer courier can be a highest ranked photographer courier. Additionally or alternatively, the courier management module 114 can identify a number of highest ranked photographer couriers and select a photographer courier from those highest ranked photographer couriers. In at least one example, the selected photographer courier can be the photographer courier 126.

The courier management module 114 can further send a communication to request that the photographer courier 126 fulfill the request 402. For instance, the courier management module 114 can send the communication to the photographer courier computing device 106 associated with the photographer courier 126. The communication can cause the photographer courier computing device 106 to present an indication of the request that the photographer courier fulfill the request 402, for example, via the courier user interface 128. In some examples, such a request can include a pick-up location/destination, a scheduled time, services requested, and, in some examples, an amount that the photographer courier 126 will be paid if it accepts the job. For example, the photographer courier device can generate one or more graphic user interfaces (GUIs) that present the indication of the request 402, which can be presented via the courier user interface 128. In at least one example, the indication of the request 402 can be associated with dispatch instruction(s) 406 for fulfilling the request 402.

The techniques and arrangements for automatically dispatching requests to photographer couriers can provide a high degree of scalability, unlike manual dispatching of requests to photographer couriers. Furthermore, in contrast to the techniques and arrangements described herein, in manual dispatching, different dispatchers can exercise different judgments, resulting in inconsistent performance. In addition, the techniques and arrangements described herein can reduce the amount of network resources used due to a decrease in communications between dispatchers and photographer couriers. This can increase the network bandwidth. Nevertheless, techniques described herein can additional use manual dispatching in addition to, or as an alternative of, the automatic dispatching described herein.

In at least one example, the photographer courier 126 can confirm acceptance of the dispatch instruction(s) 406, via an indication of a confirmation 408, which can be provided via an interaction with the courier user interface 128. In at least one example, the dispatch instruction(s) 406 can instruct the photographer courier 126 to travel to the location of the merchant 404 to capture image(s) of item(s) of the merchant 122. In such an example, the photographer courier 126 can travel to the location of the merchant 404 to capture image(s) 410 of item(s) of the merchant 122. In some examples, the photographer courier 126 can capture images via an image capturing mechanism 134 integrated with the courier user interface 128. In additional or alternative examples, the photographer courier 126 can use an alternative image capturing device 108, which can transmit the image(s) 410 to the photographer courier computing device 106 and the photographer courier computing device 106 can transmit the image(s) 410 to the server computing device(s) 102. The server computing device(s) 102 (e.g., the content module 110) can evaluate the image(s) 410, as described below, and can integrate the image(s) 410 into the web page 138 (or other content item) of the merchant 122.

In some examples, if the photographer courier 126 does not accept the dispatch instruction(s) 406, the courier management module 114 can repeat the processes described above to select another, alternative photographer courier to fulfill the request 402.

While FIGS. 2-4 illustrate three examples of how the merchant 122 can procure images using techniques described herein, additional or alternative image procurement processes can be imaged. For instance, in some examples, the merchant 122 can capture an image of an item using an image capturing device 108 and can provide such an image to the server computing device(s) 102. In such examples, the merchant 122 may or may not have used guidance as described herein.

Figure 5:
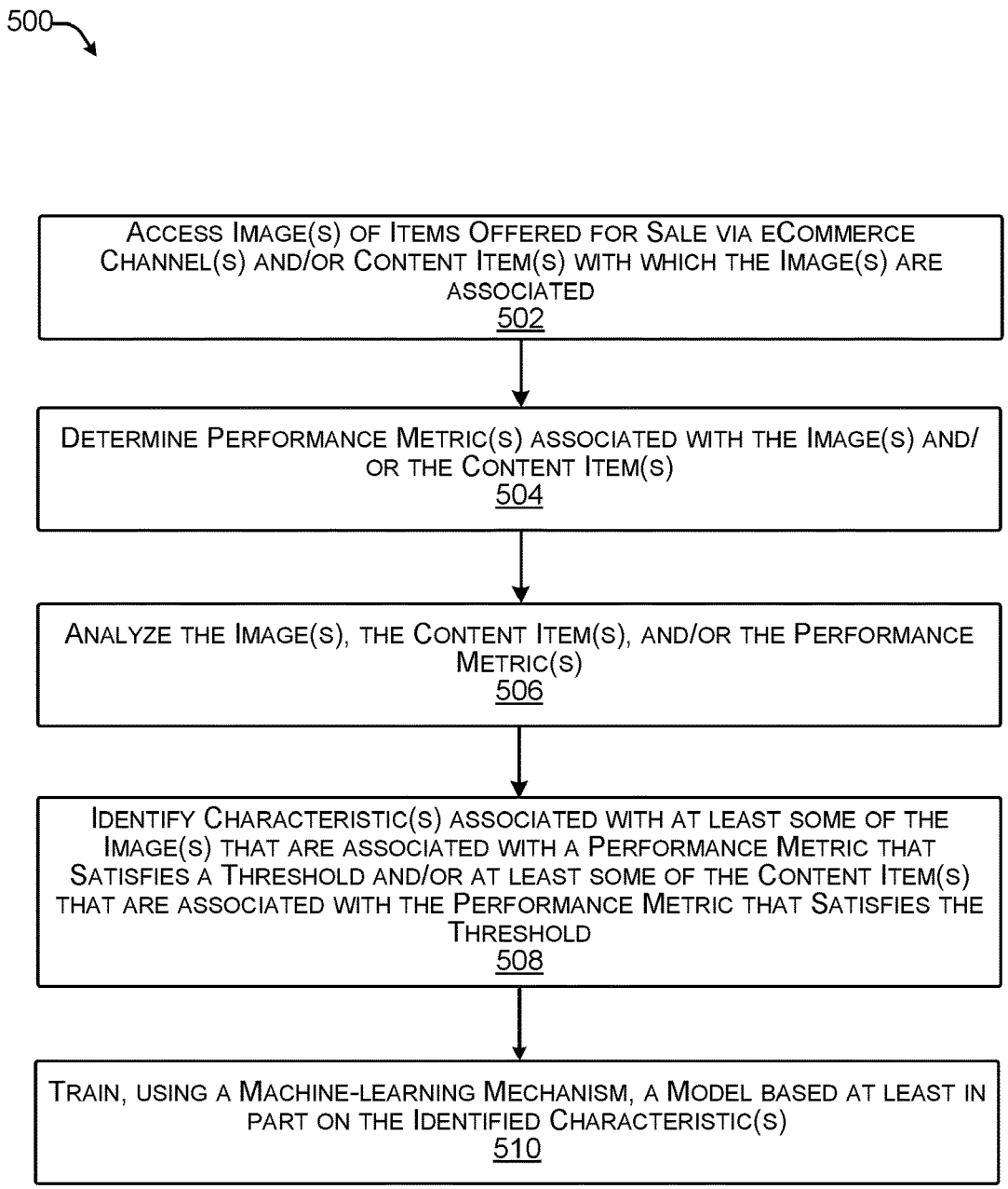
FIG. 5 illustrates an example process for training, using a machine-learning mechanism, a model for predicting performance of a new image based on characteristics of image(s) and/or content item(s) associated with the image(s), as described herein.

FIG. 5 illustrates an example process 500 for training, using a machine-learning mechanism, a model for predicting performance of a new image based on characteristics of image(s) and/or content item(s) associated with the image(s), as described herein.

Block 502 illustrates accessing image(s) of items offered for sale via ecommerce channel(s) and/or content item(s) with which the image(s) are associated. In at least one example, the content module 110 can receive and/or otherwise access image(s) associated with item(s) offered for sale by one or more merchants. In some examples, the content module 110 can crawl existing web pages and/or other ecommerce content items (e.g., social media posts, digital marketing materials, marketplace posts, etc.) to access such images. In other examples, the content module 110 can receive images from merchants (e.g., via merchant computing devices) and/or image capturing devices for integration into content items generated by the content module 110. In at least one example, the images can be captured by merchant computing devices, stored in a data store (e.g., locally, remotely, etc.), etc. The content module 110 can additionally access content items, presenting such images, generated by the content module 110 (from images received from merchants and/or image capturing devices).

Block 504 illustrates determining performance metric(s) associated with the image(s) and/or the content item(s). In at least one example, the image(s) and/or content item(s) with which the image(s) are associated can be associated with performance metrics. Performance metrics can include, but are not limited to, sales, conversion rates (e.g., a percentage of visitors that land on a content item who complete a purchase or otherwise make it to a predefined point in a commerce flow, a percentage of visitors that view an image who complete a purchase for the item corresponding to the image or otherwise make it to a predefined point in a commerce flow), total revenues, growth rates, page views, mouseover rates, click rates, dwell rates, bounce rates (e.g., landing on and immediately leaving a content item), share rates (e.g., to other ecommerce channels), social chatter (e.g., mentions on social media platforms), subscriptions, engagements (e.g., do visitors look through multiple views of an item, do visitors actuate a 360-degree spin image, do visitors take a closer look at an item (e.g., zoom in), etc.), etc.

Block 506 illustrates analyzing the image(s), the content item(s), and/or the performance metric(s). In at least one example, the courier management module 114 can utilize a training module (not pictured in FIG. 1, but described below with reference to FIG. 15), to analyze the image(s) and, in some examples, content item(s) with which the image(s) are associated. In some examples, the training module can analyze the image(s) and/or content item(s) with which the image(s) are associated in view of the performance metrics associated therewith to identify common characteristics between the image(s) and/or the content item(s) that are associated with performance metrics that satisfy corresponding thresholds. In some examples, the training module can utilize machine-learning mechanisms to analyze the image(s) and/or content item(s). In additional or alternative examples, the training module can use other computer vision and/or image processing models, statistical models, and/or the like to analyze the image(s) and/or the content item(s).

Block 508 illustrates identifying characteristic(s) associated with at least some of the image(s) that are associated with a performance metric that satisfies a threshold and/or at least some of the content item(s) that are associated with the performance metric that satisfies the threshold. In at least one example, the training module can analyze the image(s) and/or content item(s) with which the image(s) are associated in view of the performance metrics associated therewith to identify commonalities between the image(s) and/or the content item(s) with which the image(s) are associated. For example, the training module can utilize a machine-learning mechanism to analyze the image(s) to identify one or more characteristics shared by at least some of the image(s) and/or content item(s), for instance, that are associated with one or more performance metrics that satisfy respective thresholds. The thresholds corresponding to each of the performance metrics can be configurable. That is, the training module can utilize a machine-learning mechanism to analyze the image(s) to identify one or more characteristics shared by at least some of the image(s) and/or content item(s) that are deemed to be "successful" or strong performers. Such characteristics can include, but are not limited to, views, positions of items, portions of items depicted, groupings of items, background color, filter, lighting (e.g., dimming, color temperature, saturation, etc.), focus, resolution, zoom, composition, and other image characteristics.

Block 510 illustrates training, using a machine-learning mechanism, a model based at least in part on the identified characteristic(s). In at least one example, the identified characteristic(s) can be used in analyzing new images. In at least one example, techniques described herein can utilize the identified characteristic(s) to predict which new images are likely to be performant (e.g., be associated at least one performance metric that satisfies a threshold). In some examples, the characteristic(s) can be used for training a model via a machine-learning mechanism (e.g., a machine-trained model). Such a machine-trained model can be used to analyze new images and output an indication (e.g., a performance score, etc.) of whether new images are likely to be performant (e.g., based on characteristics present in the new images). In some examples, the machine-trained model can be trained on training data that is particular to individual items, merchant verticals (e.g., MCCs), etc., such that item (type)-specific machine-trained models can be used for determining whether new images of particular types of items are likely to be performant, merchant vertical-specific machine-trained models can be used for determining whether new images associated with particular merchant verticals are likely to be performant, and so on.

Figure 6:
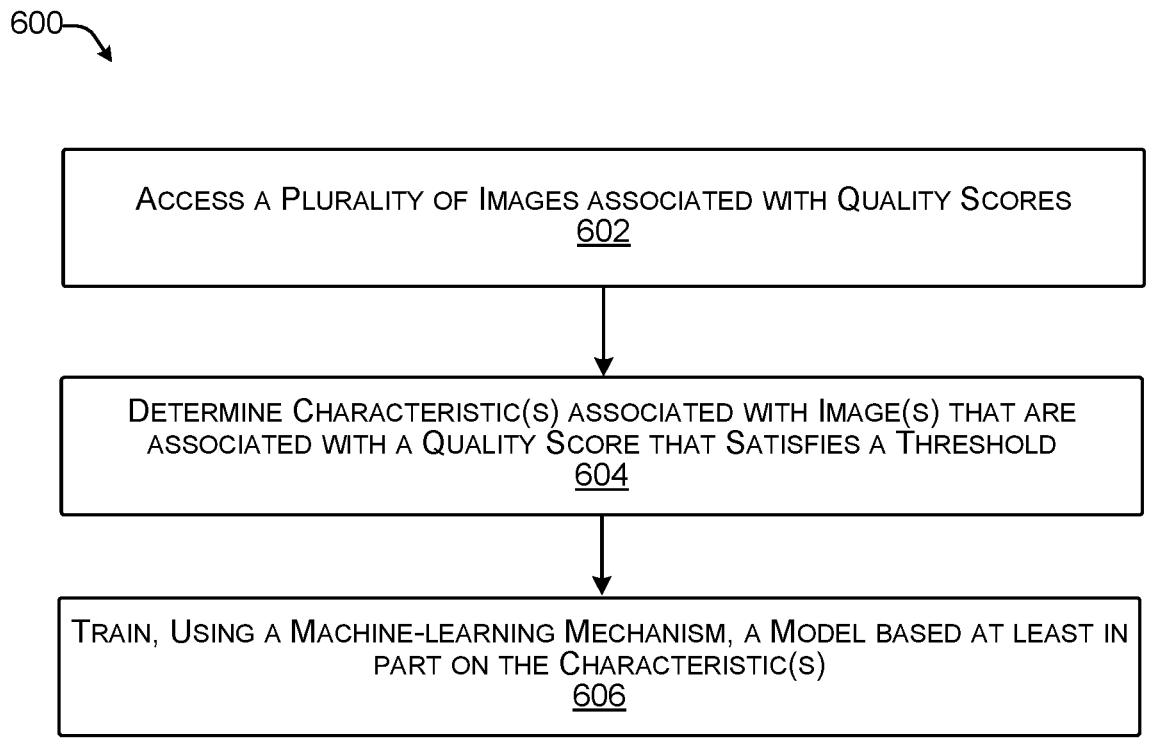
FIG. 6 illustrates an example process for training, using a machine-learning mechanism, a model for assessing the quality of a new image, as described herein.

FIG. 6 illustrates an example process 600 for training, using a machine-learning mechanism, a model for assessing the quality of a new image, as described herein.

Block 602 illustrates accessing a plurality of images. In at least one example, the content module 110 can receive and/or otherwise access image(s) associated with item(s). In some examples, the content module 110 can crawl existing web pages and/or other ecommerce content items (e.g., social media posts, digital marketing materials, marketplace posts, etc.) to access such images. In other examples, the content module 110 can receive images from merchants (e.g., via merchant computing devices) and/or image capturing devices for integration into content items generated by the content module 110. In some examples, the images can be captured by merchant computing devices, stored in a data store (e.g., locally, remotely, etc.), etc. In at least one example, individual of the images can be tagged or otherwise associated with an indication of quality (e.g., a quality score).

Block 604 illustrates determining characteristic(s) associated with image(s) that are associated with a quality score that satisfies a threshold. In at least one example, the training module can analyze the plurality of images. The training module can utilize a machine-learning mechanism to identify characteristics associated with images having a quality score above a threshold, which can be configurable. For example, such characteristic(s) can include, but are not limited to, background color, filter, lighting (e.g., dimming, color temperature, saturation, etc.), focus, resolution, zoom, composition, and other image characteristics to determine a quality score associated with a new image.

Block 606 illustrates training, using a machine-learning mechanism, a model based at least in part on the identified characteristic(s). In at least one example, the identified characteristic(s) can be used in analyzing new images. In at least one example, techniques described herein can utilize the identified characteristic(s) to assess the quality of new images. In some examples, the characteristic(s) can be used for training a model via a machine-learning mechanism (e.g., a machine-trained model). Such a machine-trained model can be used to analyze new images and output an indication (e.g., a quality score, etc.) of the quality of the new images.

Figure 7:
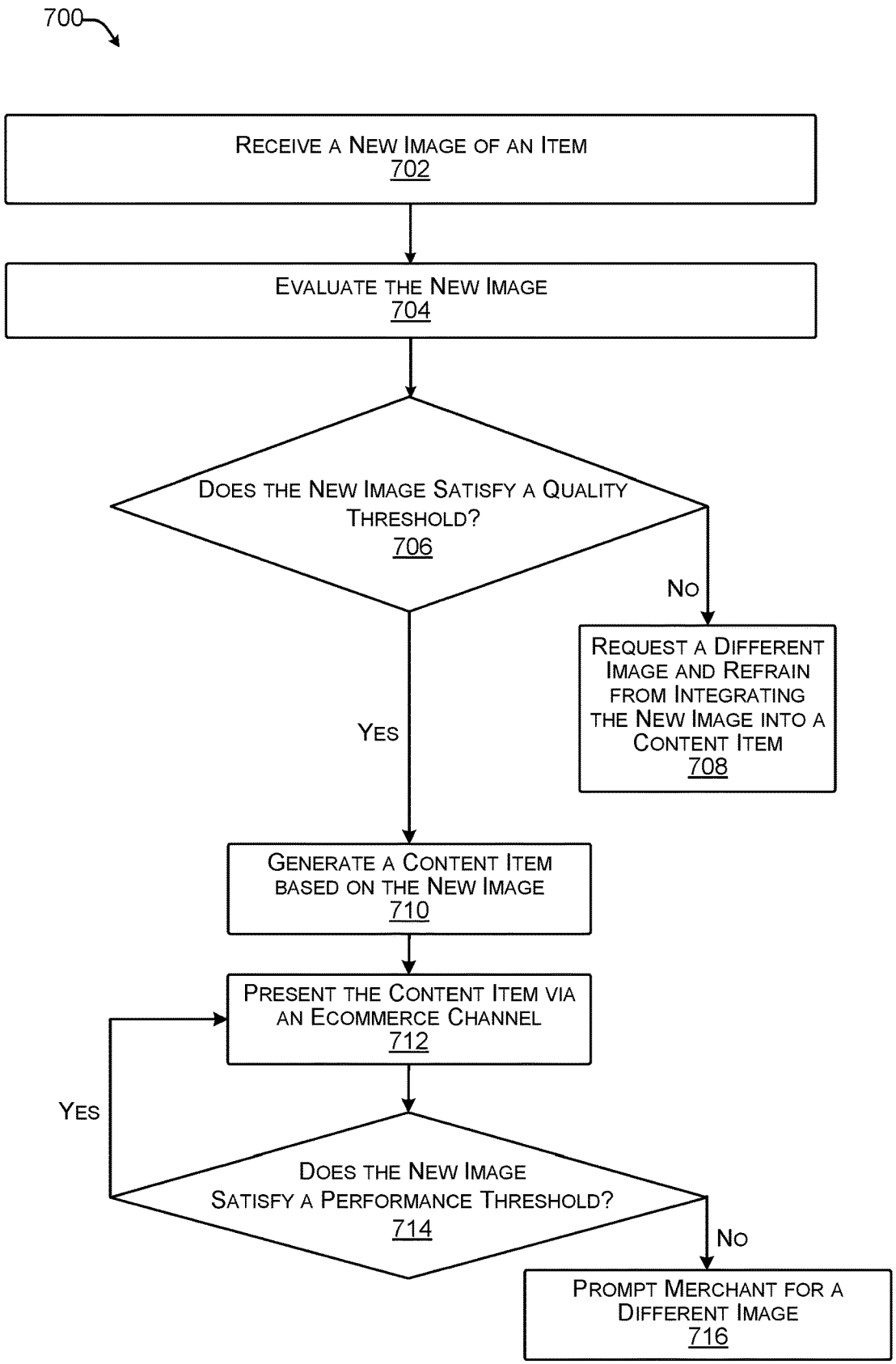
FIG. 7 illustrates an example process for analyzing a new image to determine whether to integrate the new image into a content item, as described herein.

FIG. 7 illustrates an example process 700 for analyzing a new image to determine whether to integrate the new image into a content item, as described herein.

Block 702 illustrates receiving a new image of an item. In at least one example, the content module 110 can receive a new image of an item to be offered for sale by the merchant 122 (or, in some examples, of an item that is already offered for sale). In some examples, the new image can be received from the image capturing device 108 (e.g., via an image capturing user interface 130). In other examples, the new image can be received from the ecommerce user interface 124 or the courier user interface 128. As described above, in some examples, the content module 110 can receive or otherwise access an image captured by a merchant 122 via their own device, an image that is stored by the merchant 122 (e.g., on their mobile device, in a digital photo album, a cloud storage, etc.), an image presented via a social networking service, or the like.

Block 704 illustrates evaluating the new image. In at least one example, the content module 110 can evaluate the new image. For instance, the content module 110 can access one or more machine-trained models to evaluate the new image to determine (i) whether it satisfies a quality threshold and/or (ii) whether it satisfies a performance threshold. In at least one example, the content module 110 can utilize the machine-trained models described above with reference to FIGS. 5 and 6.

Block 706 illustrates determining whether the new image satisfies a quality threshold. As described above, machine-trained model can be trained to analyze new images and output an indication (e.g., a quality score, etc.) of the quality of the new images. In at least one example, such a quality score can be based on one or more characteristics of the new image. If the resulting quality score does not satisfy a quality threshold, the content module 110 can request a different image and refrain from integrating the new image into a content item, as illustrated in block 708. That is, if the new image has a poor quality, the content module 110 can refrain from using the new image for generating a content item. Instead, the content module 110 can request a different image from the merchant 122, as illustrated in block 708. In some examples, such a request can be associated with one or more options for using services available via the ecommerce service provider. For example, such a request can be associated with a recommendation that the merchant 122 send, or otherwise provide, the item to a location of the ecommerce service provider so that the ecommerce service provider can capture image(s) of the item using the image capturing device 108. Additionally or alternatively, the request can provide the merchant 122 with an option to request a photographer courier to come to the location of the merchant 122 to perform image capturing services and/or to pick up the item for transport to a location of the ecommerce service provider so that the ecommerce service provider can capture image(s) of the item using the image capturing device 108. Further, in at least one example, the request can provide the merchant 122 with instructions for capturing a new image with their own image capturing device.

However, if the new image satisfies a quality threshold, in block 706, the content module 110 can generate a content item based on the new image, as illustrated in block 710. Based at least in part on analyzing the new image, the content module 110 can determine that the new image is of sufficient quality to be integrated into a content item (e.g., satisfies the quality threshold). As such, the content module 110 can generate a content item, as illustrated in block 710, which can be presented via an ecommerce channel, as illustrated in block 712. For example, the image(s) can be incorporated into a social media post, a digital marketing item, an email, a message, a web page, a marketplace post, and so on. In some examples, however, the new image can be temporarily integrated into the content item, as described below.

In at least one example, the content module 110 can determine whether the new image satisfies a performance threshold, as illustrated in block 714. In at least one example, a machine-trained model can be used to analyze new images and output an indication (e.g., a performance score, etc.) of whether new images are likely to be performant (e.g., based on characteristics present in the new images). In some examples, the machine-trained model can be trained on training data that is particular to individual items, merchant verticals (e.g., MCCs), etc., such that item (type)-specific machine-trained models can be used for determining whether new images of particular types of items are likely to be performant, merchant vertical-specific machine-trained models can be used for determining whether new images associated with particular merchant verticals are likely to be performant, and so on. In at least one example, the content module 110 can utilize such a machine-trained model to determine a performance score associated with the new image.

If the performance score does not satisfy a performance threshold, the content module 110 can prompt the merchant for a different image, as illustrated in block 716. That is, if the new image is not likely to perform well, the content module 110 can generate a content item but can prompt the merchant 122 for a different image that is likely to perform better for the merchant 122. In some examples, such a prompt can be associated with one or more options for using services available via the ecommerce service provider. For example, the prompt can be associated with a recommendation that the merchant 122 send, or otherwise provide, the item to a location of the ecommerce service provider so that the ecommerce service provider can capture image(s) of the item using the image capturing device 108. Additionally or alternatively, the prompt can provide the merchant 122 with an option to prompt a photographer courier to come to the location of the merchant 122 to perform image capturing services and/or to pick up the item for transport to a location of the ecommerce service provider so that the ecommerce service provider can capture image(s) of the item using the image capturing device 108. Further, in at least one example, the prompt can provide the merchant 122 with instructions for capturing a new image with their own image capturing device.

In some examples, the content module 110 can refrain from performing a quality evaluation and, in such examples, can proceed directly to a performance evaluation. Further, while FIG. 7 breaks out the evaluation of the new image into determining whether the new image satisfies a quality threshold and/or a performance threshold, in additional or alternative examples, quality, performance, and additional or alternative aspects of images can be evaluated at the same time and can be associated with a single score, rating, or other indicator, which can be indicative of whether a new image should be integrated into a content item or can be improved (to drive performance metrics). In at least one example, results associated with the analysis of the new image can be presented to the merchant 122, for instance, via the ecommerce user interface 124. In at least one example, the results can indicate a quality score (or other indicator) associated with the new image, a performance score (or other indicator) representative of performance potential, an indication of whether the new image is to be integrated into a content item (or not), a request for a different image, instructions for acquiring a different image, and so on.

While FIG. 7 is described above with reference to operations performed by the content module 110, in some examples, such operations can be performed locally on the merchant computing device 104, the photographer courier computing device 106, and/or the image capturing device 108, for example, via their respective user interfaces. For instance, if the ecommerce user interface 124 is presented via an application, the application can perform operations attributed to the content module 110 above.

Furthermore, while FIG. 7 is described above with reference to a "new" image, such a "new" image can refer to an image that the content module 110 has not evaluated before and/or any other image that is being provided for evaluation. Moreover, in some examples, a "new" image can refer to an image that is being re-evaluated, for example, if the machine-trained model is updated and an image that has been previously evaluated is re-evaluated using the updated machine-trained model.

In some examples, responsive to the merchant 122 submitting an image (or a request for an image), the content module 110 can identify one or more other images to recommend to the merchant 122. For example, if the merchant 122 submits a new image of an item, the content module 110 can identify one or more stock images (e.g., of the image(s) 120) of the item to recommend to the merchant 122 instead of, or in addition to, their own images. In an additional or alternative example, if the merchant 122 submits a new image of an item, the content module 110 can identify a stock image (e.g., of the image(s) 120) of the item being used and/or an item resulting from the use of the item to recommend to the merchant 122 instead of, or in addition to, their own images. Furthermore, in some examples, the content module 110 can identify content of an image and can generate recommendations for grouping one or more additional items in an image. In such examples, such recommendations can be based on performance metrics as described above. In additional or alternative examples, such recommendations can be based on transaction data associated with brick-and-mortar and/or ecommerce transactions (e.g., what item(s) are frequently purchased together).

For example, if the merchant 122 submits new images of yarn and needles, the content module 110 can identify one or more stock images (e.g., of the image(s) 120) of yarn and/or needles to recommend to the merchant 122 instead of, or in addition to, their own images. In an additional or alternative example, if the merchant 122 submits new images of yarn and needles, the content module 110 can identify a stock image (e.g., of the image(s) 120) of yarn and needles being used together and/or an item (e.g., a blanket) resulting from the use of the yarn and needles to recommend to the merchant 122 instead of, or in addition to, their own images. In some examples, the content module 110 can additionally or alternatively recommend that the merchant 122 add other knitting accessories to be bundled with the yarn and needles, in an image and/or via a bundled offer for sale.

Figure 8:
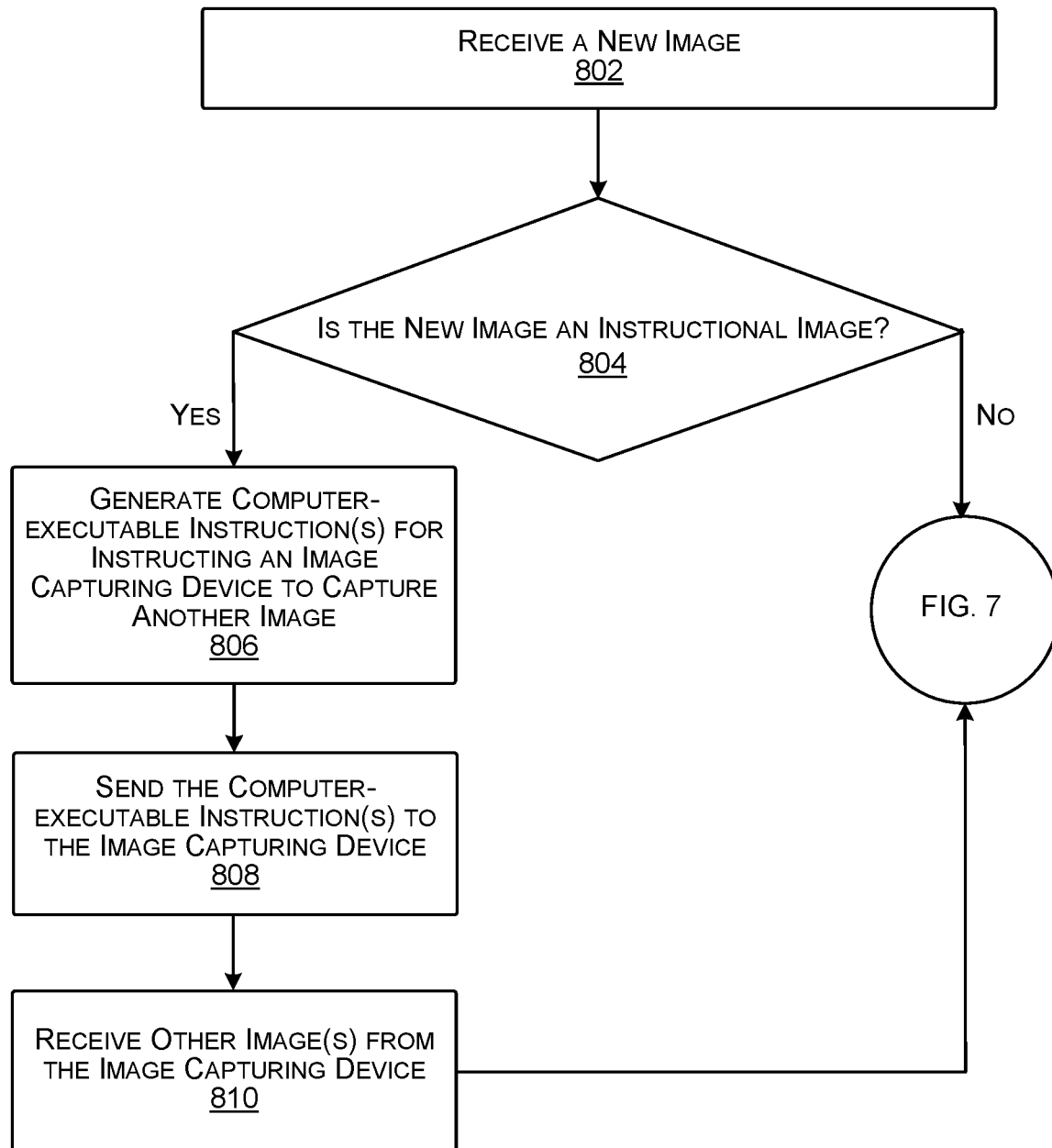
FIG. 8 illustrates an example process for generating a content item that is to be presented via an ecommerce channel, as described herein.

FIG. 8 illustrates an example process 800 for generating a content item that is to be presented via an ecommerce channel, as described herein.

Block 802 illustrates receiving a new image. In at least one example, the content module 110 can receive a new image of an item to be offered for sale by the merchant 122 (or, in some examples, of an item that is already offered for sale). In some examples, the new image can be received from the image capturing device 108 (e.g., via an image capturing user interface 130). In other examples, the new image can be received from the ecommerce user interface 124 or the courier user interface 128. As described above, in some examples, the content module 110 can receive or otherwise access an image captured by a merchant 122 via their own device, an image that is stored by the merchant 122 (e.g., on their mobile device, in a digital photo album, a cloud storage, etc.), an image presented via a social networking service, or the like.

In at least one example, the new image can be an instructional image that is intended to be used for instructing an image capturing device 108 how to capture an image (e.g., cueing the image capturing device 108). For example, the instructional image can be an image of a particular view of an item (e.g., top view, bottom view, side view (e.g., left or right), perspective view, etc.), a particular feature of the item, and so on. In other examples, the new image can be an image that the merchant 122 intends to use for integrating into content that is to be published via an ecommerce channel. In at least one example, prior to receiving the new image, the merchant 122 can have used guidance and/or instruction(s) to enable the merchant 122 to capture one or more instruction images that are to be used for cueing an image capturing device 108. That is, in some examples, the ecommerce service provider can determine and/or provide instruction(s) with respect to what views and/or features to capture for an instructional image(s) to be used for cueing the image capturing device 108.

Block 804 illustrates determining whether the new image is an instructional image. In at least one example, the content module 110 can analyze the new image to determine whether the new image is an instructional image. In some examples, an instructional image can be submitted with a request for the ecommerce service provider to perform image capturing services for the merchant 122. If the new image is associated with such a request, the content module 110 can determine that the new image is an instructional image. Or, if the new image is submitted responsive to a request from the content module 110 for instructional images, the content module 110 can determine that the new image is an instructional image. In at least one example, the content module 110 can analyze the new image using computer vision and/or image processing techniques to determine whether the new image is an instructional image. In at least one example, the content module 110 can prompt the merchant 122 to confirm that the new image is an instructional image.

Block 806 illustrates generating computer-executable instruction(s) for instructing an image capturing device to capture another image. Based at least in part on determining that the new image is an instructional image, the content module 110 can generate computer-executable instruction(s) for instructing an image capturing device to capture another image (e.g., based on the instructional image). In some examples, the content module 110 can automatically generate the computer-executable instruction(s) without receiving input or assistance from a user. In other examples, a user can analyze the instructional image and provide at least some input or assistance for generating the computer-executable instruction(s). In at least one example, the computer-executable instruction(s) can be based at least in part on the instructional image and guidance informed based on previously received image(s) and/or content item(s) associated therewith (and, performance metrics, for example).

Block 808 illustrates sending the computer-executable instruction(s) to the image capturing device. The content module 110 can send the computer-executable instruction(s) to an image capturing device of the image capturing device 108. In at least one example, the merchant 122 can have provided the item (e.g., shipped, via photographer courier, etc.) to the ecommerce service provider and the ecommerce service provider can position the item within a field of view of the image capturing device 108. The image capturing device can execute the computer-executable instruction(s) (e.g., via a processor on the image capturing device 108) to capture image(s) of the item, and the image capturing device 108 can provide the other image(s) to the content module 110.

As an example, if the image capturing device 108 is a photo robot, as described above, the photo robot can receive the computer-executable instructions and the automated system can capture and create images (which can be two-dimensional (2D), three-dimensional (8D), still, live, and so on). In some examples, the photo robot can manipulate views, camera position control (e.g., rotation, tilt, horizontal and/or vertical movement), camera control (e.g., aperture, ISO, shutter speed, white balance, exposure compensation, focus magnification, other camera settings, etc.), lighting control (e.g., dimming, color temperature, saturation, etc.), focus and zoom control (e.g., for adjusting focus and focal length), and so on responsive to receiving the computer-executable instructions and without user input. In additional or alternative examples, the photo robot can manipulate views, camera position control (e.g., rotation, tilt, horizontal and/or vertical movement), camera control (e.g., aperture, ISO, shutter speed, white balance, exposure compensation, focus magnification, other camera settings, etc.), lighting control (e.g., dimming, color temperature, saturation, etc.), focus and zoom control (e.g., for adjusting focus and focal length), and so on responsive to receiving computer-executable instructions and/or based on user input. In some examples, the photo robot can additionally associate meta data with resulting images. In at least one example, such meta data can be automatically determined (e.g., without user input). In other examples, a user can input meta data, which can be customizable, for instance, based on the preferences of the ecommerce service provider. As described above, meta data can include, but is not limited to, description, weight, dimensions, SKU #, UPC/GTIN, etc.

In an alternative example, the content module 110 can generate instructions for guiding a user of an image capturing device 108 through capturing image(s) of the item. In some examples, the instructions can be based on the new image and guidance informed based on previously received image(s) and/or content item(s) associated therewith (and, performance metrics, for example). In such an example, the instructions can be presented via a user interface such that the photographer can follow the instructions in an effort to capture images that are of sufficient quality for integration into a content item and/or are likely to perform well (e.g., based on performance metrics as described above).

Block 810 illustrates receiving other image(s) from the image capturing device. In at least one example, the image capturing device 108 can transmit the image(s) of the item, captured based at least in part on the computer-executable instructions (or not), to the content module 110. In such an example, the image(s) can be analyzed via the process 700 described above with reference to FIG. 7.

If the new image is not an instructional image, the content module 110 can analyze the new image via the process 700 described above with respect to FIG. 7.

Figure 9:
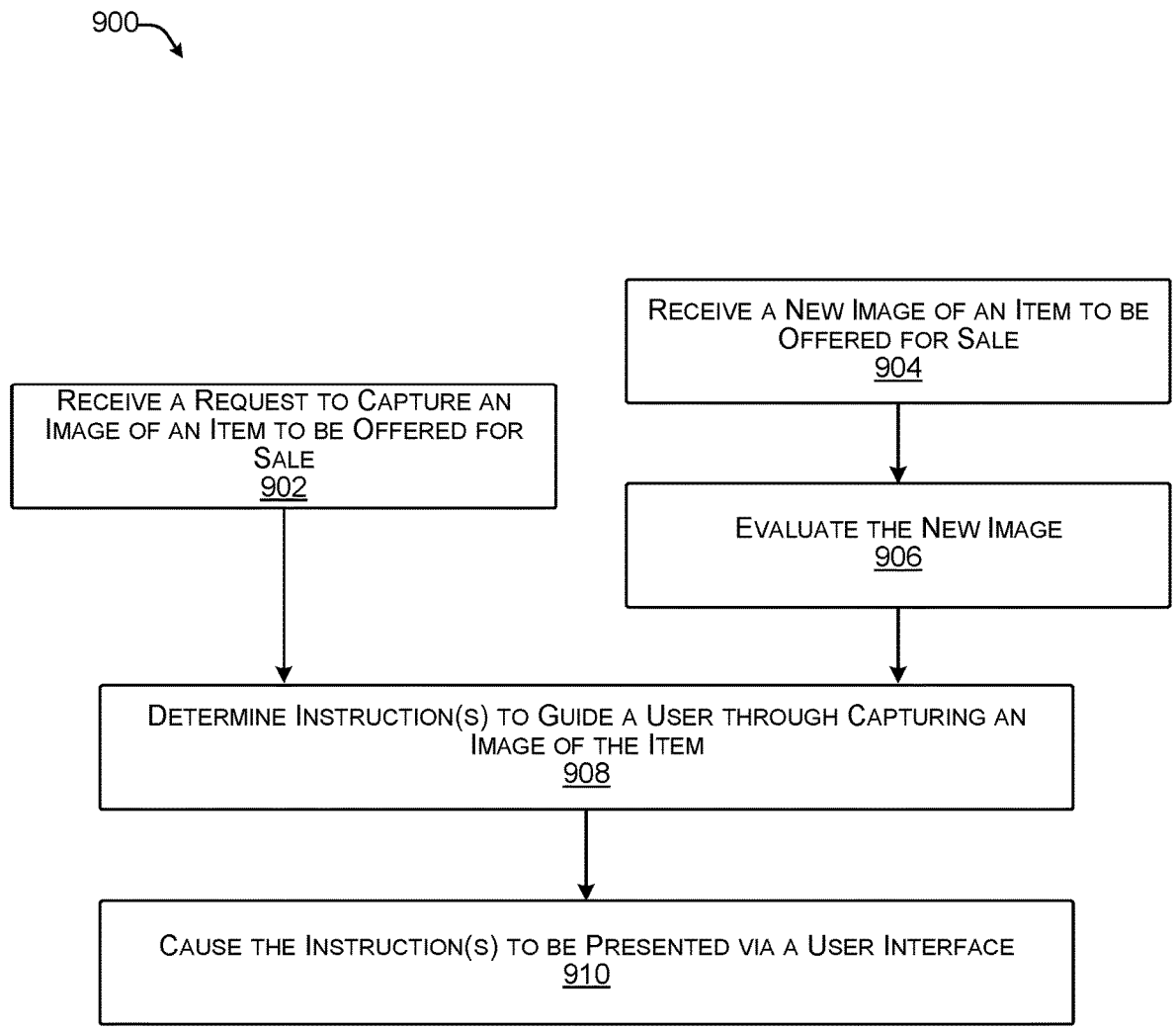
FIG. 9 illustrates an example process for providing guidance to a user for capturing an image of an item, as described herein.

FIG. 9 illustrates an example process 900 for providing guidance to a user for capturing an image of an item, as described herein.

In at least one example, process 900 can be initiated by the receipt of a request. Block 902 illustrates receiving a request to capture an image of an item to be offered for sale. In at least one example, the merchant 122 can interact with the ecommerce user interface 124 to initiate an image capturing process for capturing an image of an item to be offered for sale. In at least one example, the ecommerce user interface 124 can send the request to the content module 110 and the content module 110 can receive the request to capture the image of the item to be offered for sale. In other examples, the ecommerce user interface 124 need not transmit the request to the server computing device(s) 102, as described below.

In some examples, the merchant 122 can submit the request via the ecommerce user interface 124 on their own will (e.g., without being prompted to do so). In other examples, the merchant 122 can submit the request responsive to an image evaluation, such as described above with reference to FIG. 7, requesting and/or prompting the merchant 122 to obtain a new image. Further, in some examples, the content module 110 can crawl existing content items and evaluate existing content items to determine whether images presented in association with the existing content items can be improved (e.g., quality, performance, etc.). In such examples, the content module 110 can prompt the merchant 122 to obtain a new image, for instance via an email, text message, push notification, etc., which can be presented via the ecommerce user interface 124. Responsive to receiving such a prompt, the merchant 122 can interact with the ecommerce user interface 124 to request to capture an image of an item to be offered for sale.

In an additional or alternative example, process 900 can be initiated by the receipt of a new image. Block 904 illustrates receiving a new image of an item to be offered for sale. In at least one example, the content module 110 can receive a new image of an item to be offered for sale by the merchant 122 (or, in some examples, of an item that is already offered for sale). In some examples, the new image can be received from the image capturing device 108 (e.g., via an image capturing user interface 130). In other examples, the new image can be received from the ecommerce user interface 124 or the courier user interface 128.

Block 906 illustrates evaluating the new image. In at least one example, the content module 110 can evaluate the new image. For instance, the content module 110 can access one or more machine-trained models to evaluate the new image to determine (i) whether it satisfies a quality threshold and/or (ii) whether it satisfies a performance threshold. In at least one example, the content module 110 can utilize the machine-trained models described above with reference to FIGS. 5 and 6. As described above with respect to FIG. 7, in some examples, the result of the evaluating can indicate that the merchant 122 should obtain a new image.

Block 908 illustrates determining instruction(s) to guide a user through capturing an image of the item. In some examples, the content module 110 can determine instruction(s) for guiding a user through capturing an image of an item. In some examples, the "user" can be the merchant 122, operating the merchant computing device 104. In other examples, the "user" can be a photographer courier 126, operating a photographer courier computing device 106. Further, in some examples, the "user" can be an agent or other user working on behalf of the ecommerce service provider operating the image capturing device 108.

In at least one example, the ecommerce user interface 124 can receive information from sensors and/or other input/output devices associated with the merchant computing device 104 and can determine context information associated with the environment within which the item(s) are positioned. In some examples, such context information can be provided to the server computing device(s) 102 (e.g., the content module 110) to determine the instruction(s). In additional or alternative examples, the ecommerce user interface 124 can additionally access an image of an item, as perceived through the image capturing mechanism 132 (or another image capturing device). In some examples, the image, or features associated therewith, can be used to determine context information, which can be provided to the content module 110 for determining the instruction(s).

In at least one example, the instruction(s) can prompt the merchant 122 to modify at least one of a position of the item and/or the merchant computing device 104, a characteristic of the environment (e.g., lighting, background, etc.), a setting of the image capturing mechanism 132, and so on. In at least one example, the instruction(s) can be based on at least one of the item, a vertical of the merchant 122, a brand asset of the merchant 122, a brand standard of the merchant 122, a type of image capturing device, an intended use (e.g., type of content item, electronic content item, print content item, etc.), etc. That is, in some examples, the instruction(s) presented to the merchant 122 can be customized and/or personalized for the merchant 122 (or other similar merchants) instead of being one-size-fits-all. In at least one example, the instruction(s) can be automatically determined (e.g., based on an output of a machine-trained model). In other examples, the instruction(s) can be based on a predetermined template, which can be generated, at least in part, by a user associated with the ecommerce service provider. In some examples, the template can be informed by characteristic(s) identified in FIGS. 5 and 6 above.

Block 910 illustrates causing the instruction(s) to be presented via a user interface. In at least one example, the server computing device(s) 102 can send the instruction(s) to a user interface, such as the ecommerce user interface 124 and/or the courier user interface 128 (or, in some examples, the image capturing user interface 130). In such an example, the instruction(s) can be provided in near-real-time to guide the user through capturing different views of an item, different features of an item, in different lighting, with different focuses, different backgrounds, and so on. In some examples, the instruction(s) can be output via augmented reality, spoken output, haptic output, or any other output to convey the instruction(s) to the user.

While the example process 900 described above describes the content module 110 as generating the instruction(s) and transmitting the instruction(s) to the merchant computing device 104 and/or the photographer courier computing device 106, in some examples, the ecommerce user interface 124 and/or the courier user interface 128 can be associated with functionality to analyze context information and generate the instruction(s) locally, without transmitting the context information to the server computing device(s) 102. For instance, if the ecommerce user interface 124 and/or the courier user interface 128 is presented via an application, the application can have instructions that are executable to analyze context information and generate the instruction(s) locally. Furthermore, in some examples, such guidance can be used by a photographer using an image capturing device 108 (e.g., via the image capturing user interface 130).

Figure 10:
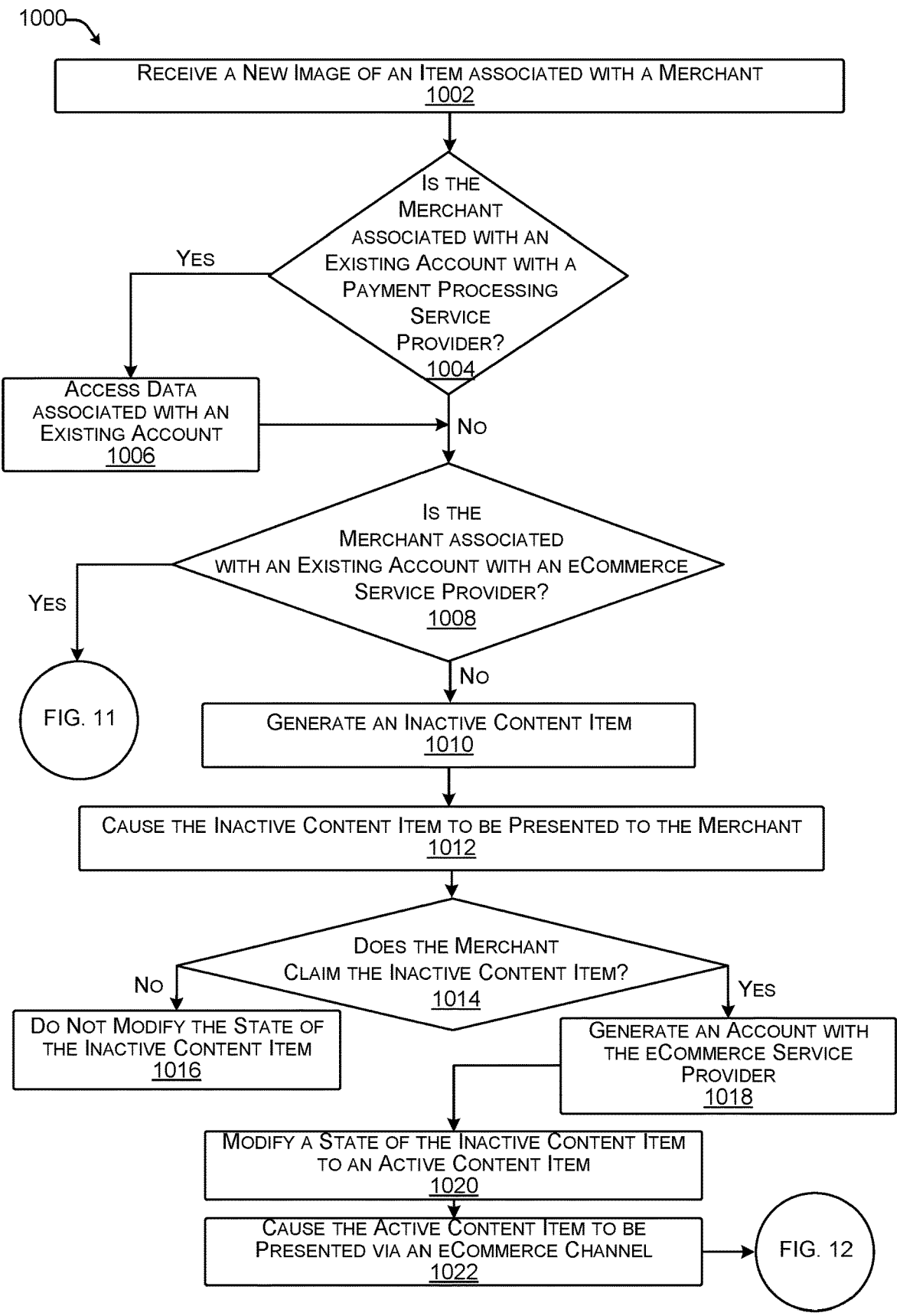
FIG. 10 illustrates an example process for onboarding a new merchant, as described herein.

FIG. 10 illustrates an example process 1000 for onboarding a new merchant, as described herein.

Block 1002 illustrates receiving a new image of an item associated with a merchant. In at least one example, the content module 110 can receive a new image of an item to be offered for sale by the merchant 122 (or, in some examples, of an item that is already offered for sale). In some examples, the new image can be received from the image capturing device 108 (e.g., via an image capturing user interface 130). In other examples, the new image can be received from the ecommerce user interface 124 or the courier user interface 128. As described above, in some examples, the content module 110 can receive or otherwise access an image captured by a merchant 122 via their own device, an image that is stored by the merchant 122 (e.g., on their mobile device, in a digital photo album, a cloud storage, etc.), an image presented via a social networking service, or the like.

In at least one example, the new image can be associated with an identifier of the merchant. For instance, if the new image is received from the ecommerce user interface 124 presented via the merchant computing device 104, the transmission of the new image can be associated with an indication of the identity of the merchant 122. Additionally or alternatively, if the new image is received from the image capturing user interface 130 and/or the courier user interface 128, the new image can be tagged with an indication of the identity of the merchant 122. Furthermore, if the new image is submitted with a request of some sort, the request can be associated with an indication of the identity of the merchant 122.

In some examples, the new image can be associated with meta data, which can include, but is not limited to, description, weight, dimensions, SKU #, UPC/GTIN, etc. That is, in at least one example, the content module 110 can receive item details associated with an item depicted in the new image. Such item details can additionally or alternatively be provided with the new image (e.g., not as meta data) and/or accessed from a third-party data source (e.g., another ecommerce channel, etc.).

Block 1004 illustrates determining whether the merchant is associated with an existing account with a payment processing service provider. In at least one example, the content module 110 can determine whether the merchant is associated with an existing account with a payment processing service provider. In some examples, a merchant 122 can be a "new merchant" such that the merchant 122 does not have an account with the ecommerce service provider and any other service provider associated with the ecommerce service provider. That is, the merchant 122 may not have a profile stored in the profile(s) 119. However, in other examples, the merchant 122 may have an account with another service provider associated with the ecommerce service provider, such as a payment processing service provider. For example, the merchant 122 can use the payment processing service provider for processing payments at a brick-and-mortar location of the merchant 122. In such an example, the merchant 122 can be associated with a profile in the profile(s) 119 that indicates that the merchant 122 has an account with the payment processing service provider. In at least one example, the content module 110 can determine whether the merchant 122 has a profile in the profile(s) 119 and/or of the profile of the merchant 122 indicates that the merchant 122 has an existing account with the payment processing service provider. Based at least in part on determining that the merchant 122 has an existing account with the payment processing service provider, the content module 110 can access data associated with the existing account of the merchant 122, as illustrated in block 1006. That is, the content module 110 can access data stored in the merchant profile.

Block 1008 illustrates determining whether the merchant is associated with an existing account with an ecommerce service provider. In at least one example, the content module 110 can access the database 118 to determine whether the merchant 122 is associated with a profile of the profile(s) 119 and/or whether the profile of the merchant 122 indicates that the merchant 122 has an account with the ecommerce service provider. In at least one example, responsive to determining that the merchant 122 has an existing account associated with the ecommerce service provider, the example process 1000 can proceed to operations described below with reference to FIG. 11. Responsive to determining that the merchant 122 does not have an existing account, the content module 110 can generate an inactive content item, as described below.

Block 1010 illustrates generating an inactive content item. In at least one example, the content module 110 can generate a content item based at least in part on receiving the new image. In some examples, the content module 110 can perform an evaluation on the new image, as described above with reference to FIG. 7, prior to generating the content item. In at least one example, the content module 110 can integrate the new image into a social media post, a digital marketing item, a web page, a marketplace post, and the like. In some examples, if the merchant 122 is associated with an existing account, the content module 110 can utilize data stored in the merchant profile for generating the content item. For example, if the data stored in the merchant profile indicates the merchant's logo, contact information, and brand colors, the content module 110 can incorporate the merchant's logo, contact information, and/or brand colors into the content item.

In some examples, item details associated with the item depicted in the new image can be integrated into the content item. For example, if the new image is associated with meta data and/or item details are provided in association with the new image, the content module 110 can generate a content item that includes the item details. Furthermore, in some examples, item details can be automatically integrated into the content item. For instance, in at least one example, a description of the item can be generated based on other item descriptions associated with images of a same item and/or content items presenting such images.

In at least one example, upon generation of the content item, the content module 110 can associate an inactive state with the content item, thus making it an "inactive content item." In at least one example, the content module 110 can cause the inactive content item to be presented to the merchant 122, for example, via the ecommerce user interface 124, as illustrated in block 1012. In some examples, the inactive content item can be presented with an offer to claim the inactive content item. In other examples, the merchant 122 may have provided a previous indication or consent sufficient to claim the inactive content item. For the purpose of this discussion, "claiming" a content item can refer to taking ownership and/or attribution of the content item such that the content item is associated with a profile of the merchant 122.

Block 1014 illustrates determining whether the merchant claims the inactive content item. If the merchant 122 does not claim the inactive content item, the content module 110 can refrain from modifying the state of the inactive content item, as illustrated in block 1016. However, if the merchant 122 claims the inactive content item, the content module 110 can generate an account with the ecommerce service provider, as described below.

Block 1018 illustrates generating an account with the ecommerce service provider. In an example where the merchant 122 is not associated with an existing account of the ecommerce service provider, the content module 110 can send a request to the onboarding module 112 to open an account for the merchant 122. In some examples, the onboarding module 112 can access data associated with an existing account (e.g., with the payment processing service provider) to generate the new account associated with the ecommerce service provider. In other examples, the onboarding module 112 can prompt the merchant 122 to answer one or more questions for onboarding, for instance, via the ecommerce user interface.

In at least one example, responsive to generating an account for the merchant 122, the content module 110 can modify a state of the inactive content item to an active content item. That is, the content module 110 can associate an active state with the content item, thereby making it an "active content item," as illustrated in block 1020. In at least one example, the content module 110 can subsequently cause the active content item to be presented via an ecommerce channel, as illustrated in block 1022. That is, the content module 110 can publish the active content item via a network, such as the Internet. As a result, customers can interact with the active content item to purchase item(s) from the merchant 122. In at least one example, the example process 1000 can proceed to operations described below with reference to FIG. 12.

Figure 11:
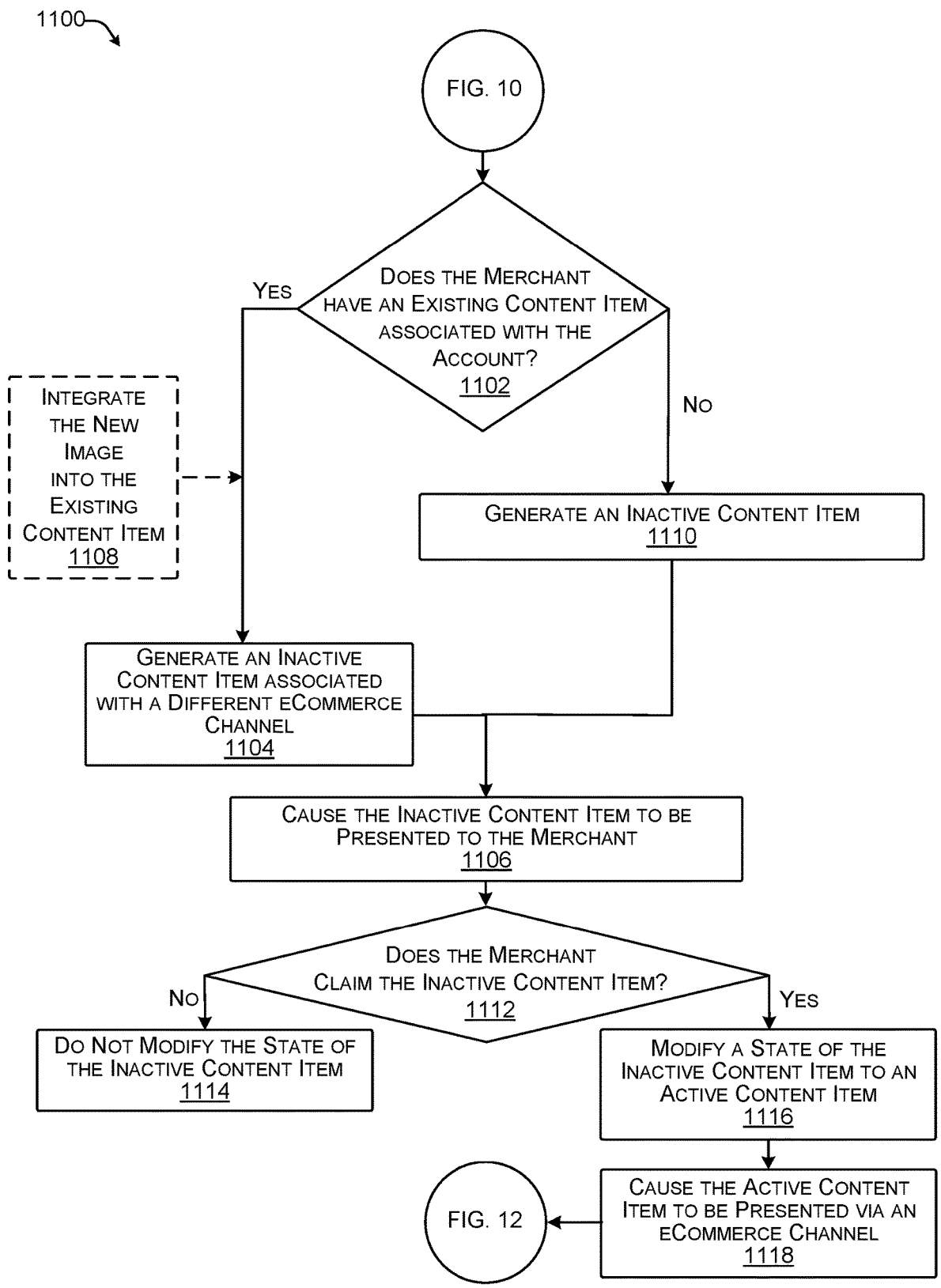
FIG. 11 illustrates an example process for integrating a new image into a content item of a merchant that has an existing account with an ecommerce service provider, as described herein.

FIG. 11 illustrates an example process 1100 for integrating a new image into a content item of a merchant that has an existing account with an ecommerce service provider, as described herein.

Block 1102 illustrates determining whether the merchant as an existing content item associated with the account. In at least one example, the content module 110 can determine whether the account of the merchant 122 is associated with any existing content items. For instance, the content module 110 can determine whether the account of the merchant 122 is associated with a web page, or another content item. Based at least in part on determining that the account of the merchant 122 is associated with an existing content item, the content module 110 can generate a content item that is associated with a different ecommerce channel than the existing content item, as illustrated in block 1104. For example, if the existing content item is a web page, the content module 110 can generate a social media post or digital marketing materials. In at least one example, the content item that is associated with the different ecommerce channel can be associated with an inactive state. In at least one example, the content module 110 can cause the inactive content item to be presented to the merchant 122, for example, via the ecommerce user interface 124, as illustrated in block 1106. In some examples, the inactive content item can be presented with an offer to claim the inactive content item. In other examples, the merchant 122 may have provided a previous indication or consent sufficient to claim the inactive content item.

In at least one example, if the merchant 122 has an existing account with an existing content item, the content module 110 can incorporate the new image into the existing content item automatically or responsive to a request from the merchant 122. In such an example, the content module 110 can cause the updated content item to be presented to the merchant 122, for example, via the ecommerce user interface 124.

Block 1110 illustrates generating an inactive content item. In at least one example, the content module 110 can generate a content item based at least in part on receiving the new image and determining that the merchant 122 does not have an existing content item associated with the account. In some examples, the content module 110 can perform an evaluation on the new image (e.g., as received in block 1002), as described above with reference to FIG. 7, prior to generating the content item. In at least one example, the content module 110 can integrate the new image into a social media post, a digital marketing item, a web page, a marketplace post, and the like. In some examples, if the merchant 122 is associated with an existing account, the content module 110 can utilize data stored in the merchant profile for generating the content item. For example, if the data stored in the merchant profile indicates the merchant's logo, contact information, and brand colors, the content module 110 can incorporate the merchant's logo, contact information, and/or brand colors into the content item. In at least one example, upon generation of the content item, the content module 110 can associate an inactive state with the content item, thus making it an "inactive content item." In at least one example, the content module 110 can cause the inactive content item to be presented to the merchant 122, for example, via the ecommerce user interface 124, as illustrated in block 1106. In some examples, the inactive content item can be presented with an offer to claim the inactive content item. In other examples, the merchant 122 may have provided a previous indication or consent sufficient to claim the inactive content item.

Block 1112 illustrates determining whether the merchant claims the inactive content item. If the merchant 122 does not claim the inactive content item, the content module 110 can refrain from modifying the state of the inactive content item, as illustrated in block 1114. That is, if the content module 110 does not receive an indication that the merchant 122 claims the inactive content item, the content module 110 can refrain from modifying the state of the inactive content item.

In at least one example, responsive to the merchant 122 claiming the inactive content item, the content module 110 can modify a state of the inactive content item to an active content item. That is, the content module 110 can associate an active state with the content item, thereby making it an "active content item," as illustrated in block 1116. In at least one example, the content module 110 can subsequently cause the active content item to be presented via an ecommerce channel, as illustrated in block 1118. In at least one example, the process 1100 can continue to operations described below with reference to FIG. 12.

Figure 12:
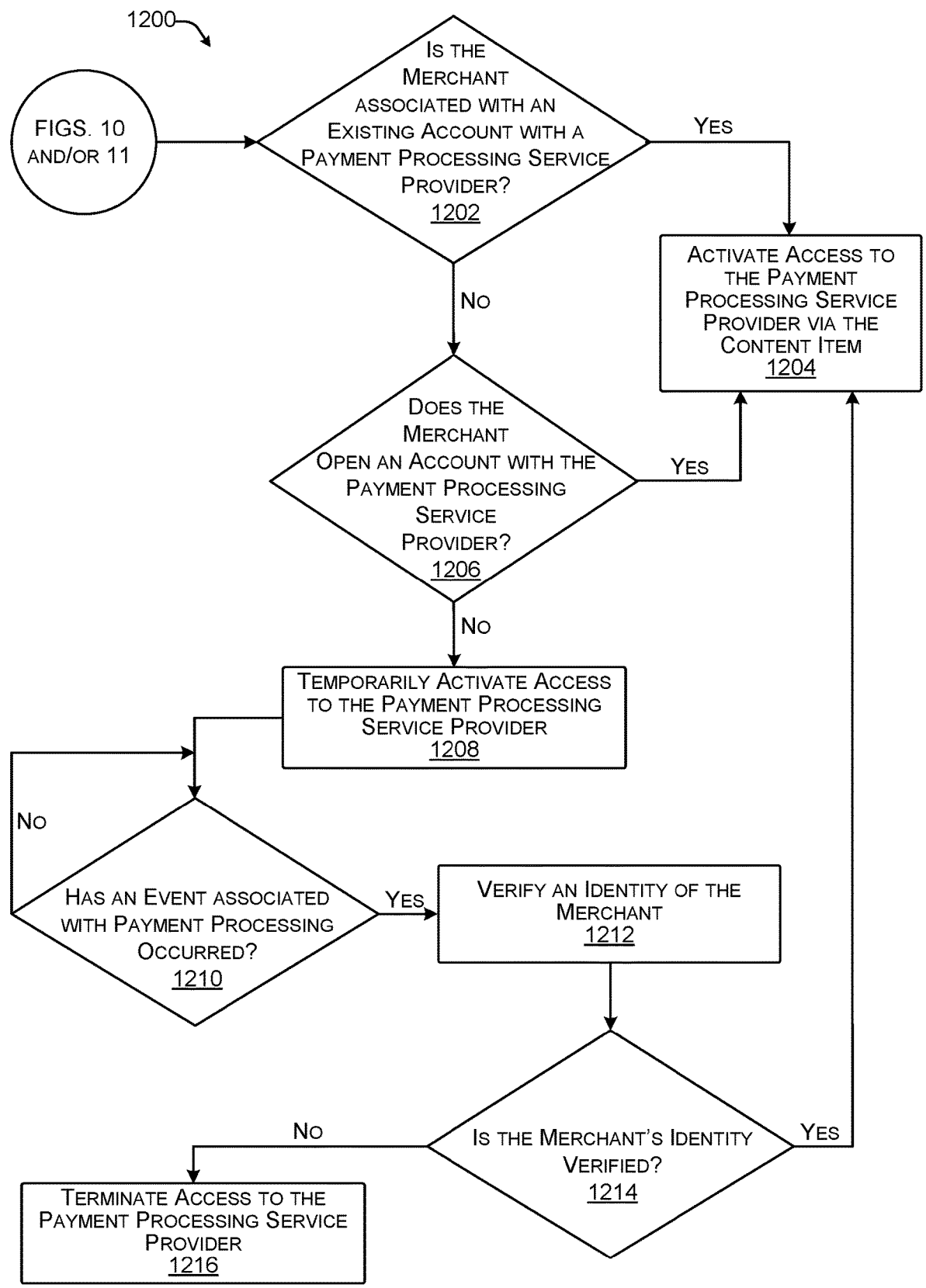
FIG. 12 illustrates an example process for onboarding anew merchant with deferred identity verification, as described herein.

FIG. 12 illustrates an example process 1200 for onboarding a new merchant with deferred identity verification, as described herein. In at least one example, for a content item to enable the merchant 122 to sell items via an ecommerce channel, the content item may require access to a payment processing service provider.

Block 1202 illustrates determining whether the merchant is associated with an existing account of a payment processing service provider. In at least one example, the content module 110 can determine whether the merchant is associated with an existing account with a payment processing service provider. As described above, in some examples, the merchant 122 may have an account with another service provider associated with the ecommerce service provider, such as a payment processing service provider. For example, the merchant 122 can use the payment processing service provider for processing payments at a brick-and-mortar location of the merchant 122. In such an example, the merchant 122 can be associated with a profile in the profile(s) 119 that indicates that the merchant 122 has an account with the payment processing service provider. In at least one example, the content module 110 can determine whether the merchant 122 has a profile in the profile(s) 119 and/or of the profile of the merchant 122 indicates that the merchant 122 has an existing account with the payment processing service provider. Based at least in part on determining that the merchant 122 has an existing account with the payment processing service provider, the content module 110 can activate access to the payment processing service provider via the content item, as illustrated in block 1204.

Block 1206 illustrates determining whether the merchant has opened an account with the payment processing service provider. Based at least in part on determining that the merchant 122 does not have an existing account with the payment processing service provider, the content module 110 can send an indication to the payment processing module 116. In some example, the payment processing module 116 can prompt the merchant 122 to open an account so that the content item can be associated with a payment mechanism. If the merchant 122 opts to open an account, the onboarding module 112 and/or the payment processing module 116 can activate access to the payment processing service provider via the content item, as illustrated in block 1204. In such an example, the onboarding module 112 can present one or more questions to (i) verify an identity of the merchant 122 and/or (ii) obtain bank account information for depositing funds received from processing payments on behalf of the merchant (and/or for paying fees owed to the payment processing service provider).

Block 1208 illustrates temporarily activating access to the payment processing service provider. In some examples, the merchant 122 may not opt to open an account with the payment processing service and the content module 110 can activate access to the payment processing service provider nevertheless. In such an example, the content module 110 can temporarily activate access to the payment processing service provider such that the merchant 122 is able to process payments via the payment processing service provider until an event occurs. Such an event can include, but is not limited to, a lapse of a period of time, a number of transactions, a total transaction amount, and so on. That is, the temporary access can be terminated upon the occurrence of the event (e.g., lapse of a period of time, a number of transactions, a total transaction amount, etc.). In at least one example, the payment processing module 116 can process payments on behalf of the merchant 122 until the event occurs (e.g., a lapse of a period of time, a number of transactions, a total transaction amount, or so on). That is, block 1210 illustrates determining whether the event has occurred. Based at least in part on the event has occurred, the onboarding module 112 can prompt the merchant 122 to verify the identity of the merchant 122, as illustrated in block 1212. That is, the onboarding module 112 can prompt the merchant 122 to answer one or more questions to verify its identity. Further, in some examples, the onboarding module 112 can prompt the merchant 122 for bank account information and/or other information required for onboarding the merchant 122 to the payment processing service provider.

Block 1214 illustrates determining whether the merchant's identity has been verified. Based at least in part on the merchant's identity having been verified, the content module 110 can activate access to the payment processing service provider via the content item, as illustrated in block 1204. That is, responsive to receiving an indication that the merchant 122 has verified its identity (and/or has otherwise been onboarded to the payment processing service), the content module 110 can enable the merchant 122 to process payments via the payment processing service. In some examples, the onboarding module 112 can perform additional steps of an onboarding process to onboard the merchant 122 with the payment processing service provider prior to activating unrestricted access to the payment processing service via the content item. However, if the merchant's identity is not verified (and/or the merchant is not otherwise onboarded to the payment processing service), the content module 110 can terminate the temporary access to the payment processing service provider. Consequently, the content module 110 can additionally modify the state of the content item to inactive (due to the fact that the content item is no longer able to be used for ecommerce transactions).

Figure 13:
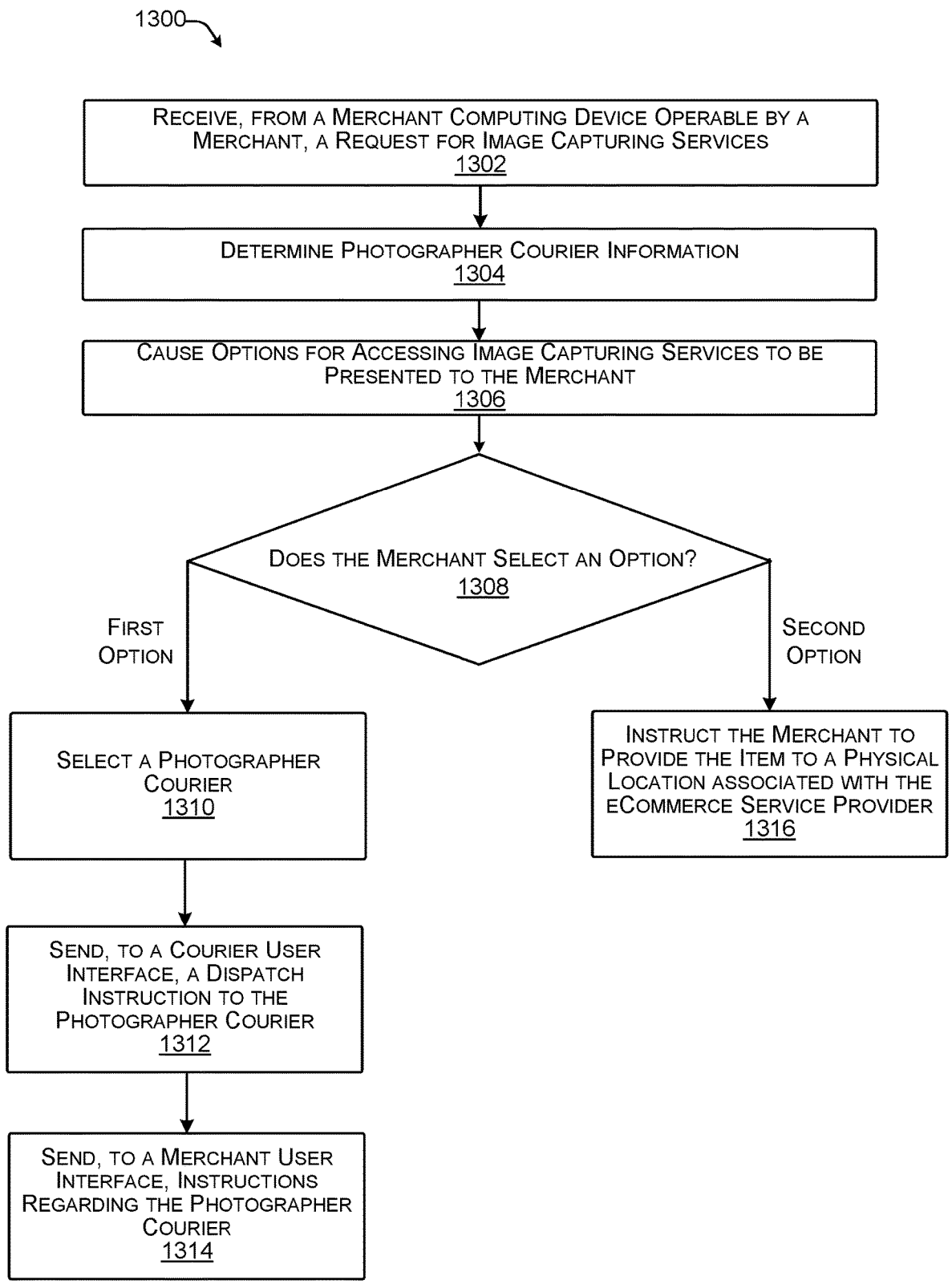
FIG. 13 illustrates an example process for dispatching a photographer courier to a location of a merchant, as described herein.

FIG. 13 illustrates an example process 1300 for dispatching a photographer courier to a location of a merchant, as described herein.

Block 1302 illustrates receiving, from a merchant computing device operable by a merchant, a request for image capturing services. In at least one example, the merchant 122 can submit a request via the ecommerce user interface 124 for a photographer courier, such as the photographer courier 126, to travel to a location of the merchant to capture images of item(s) of the merchant 122 and/or to pick-up item(s) and transport the item(s) to a location of the ecommerce service provider for image capturing services to be performed. In some examples, the request can be associated with a time, a location, a service, etc. The request can be received by the courier management module 114, e.g., via an SMS text message, voice mail, telephone call, in-app message, etc.

Block 1304 illustrates determining photographer courier information. In at least one example, the courier management module 114 can access a courier profile in the profile(s) 119 to determine photographer courier information. Additionally or alternatively, the courier management module 114 can determine location data associated with photographer couriers that are associated with an "active" state. Moreover, in at least one example, the courier management module 114 can access requests that are currently assigned to photographer couriers, completed operations, outstanding operations, and the like.

Block 1306 illustrates causing options for accessing image capturing services to be presented to the merchant. In at least one example, the courier management module 114 can determine one or more options for the merchant 122, to enable the merchant 122 to obtain image(s) of item(s) that the merchant 122 offers for sale or intends to offer for sale. In at least one example, the one or more options can include a first option to dispatch a photographer courier and a second option for the merchant 122 to provide the item(s) to a location associated with the ecommerce service provider (e.g., for image capturing services to be performed). In at least one example, the one or more options can be presented to the merchant 122, for instance via the ecommerce user interface 124. In at least one example, the options can be determined based at least in part on the merchant 122 submitting the request, the geolocation of the merchant 122, the vertical (e.g., MCC) of the merchant 122, the item(s) for which image capturing services are requested, and so on.

Block 1308 illustrates determining whether the merchant selects an option. Based at least in part on receiving an indication that the merchant 122 selects the first option, the courier management module 114 can select a photographer courier, as illustrated in block 1310.

In some examples, the courier management module 114 can evaluate active photographer couriers, i.e., photographer couriers that are capable of receiving request assignments from the courier management module 114 during a time period in which the photographer courier evaluation occurs as described above with reference to FIG. 4. In at least one example, the courier management module 114 can rank the active photographer couriers. In some examples, the courier management module 114 can select a photographer courier based at least in part on the ranking of the active photographer couriers. The photographer courier can be a best, or first choice, photographer courier for fulfilling the request 402. In some cases, the selected photographer courier can be a highest ranked photographer courier. Additionally or alternatively, the courier management module 114 can identify a number of highest ranked photographer couriers and select a photographer courier from those highest ranked photographer couriers.

Block 1312 illustrates sending, to a courier user interface, a dispatch instruction to the photographer courier. The courier management module 114 can further send a communication to request that the photographer courier 126 to fulfill the request. For instance, the courier management module 114 can send the communication to the photographer courier computing device 106 associated with the photographer courier 126. The communication can cause the photographer courier computing device 106 to present an indication of the request that the photographer courier fulfill the request. In some examples, such a request can include a pick-up location/destination, a scheduled time, services requested, and, in some examples, an amount that the photographer courier will be paid if it accepts the job. For example, the photographer courier device can generate one or more graphic user interfaces (GUIs) that present the indication of the request, which can be presented via a courier user interface 128. In at least one example, the indication of the request can be associated with dispatch instruction(s) for fulfilling the request.

In at least one example, the photographer courier 126 can confirm acceptance of the dispatch instruction(s), via an indication of a confirmation, which can be provided via an interaction with the courier user interface 128. In at least one example, the dispatch instruction(s) can instruct the photographer courier 126 to travel to the location of the merchant to capture image(s) of item(s) of the merchant 122. In such an example, the photographer courier 126 can travel to the location of the merchant to capture image(s) of item(s) of the merchant 122.

Block 1314 illustrates sending, to a merchant user interface, instructions regarding the photographer courier. In at least one example, responsive to receiving a confirmation that the photographer courier has accepted the request, the courier management module 114 can send instruction(s) regarding the photographer courier to the merchant 122 (e.g., the merchant computing device 104). In at least one example, the ecommerce user interface 124 can present the instruction(s) to the merchant 122. Such instruction(s) can indicate which photographer courier has been selected, identifying information associated with the selected photographer courier, a time at which the photographer courier is scheduled to arrive, a location for meeting the photographer courier, etc.

Block 1316 illustrates instructing the merchant to provide the item to a physical location associated with the image capturing service provider. In at least one example, the merchant 122 can select the second option (e.g., due to cost, timing, availability, etc.) and, responsive to the merchant 122 selecting the second option, the courier management module 114 can send instructions to the merchant computing device 104 instructing the merchant 122 to provide the item(s) to a location associated with the ecommerce service provider. In at least one example, a physical location of the ecommerce service provider can include an image capturing facility, a physical location of another merchant, or any other physical location equipped with image capturing devices for capturing images as described herein.

Figure 14:
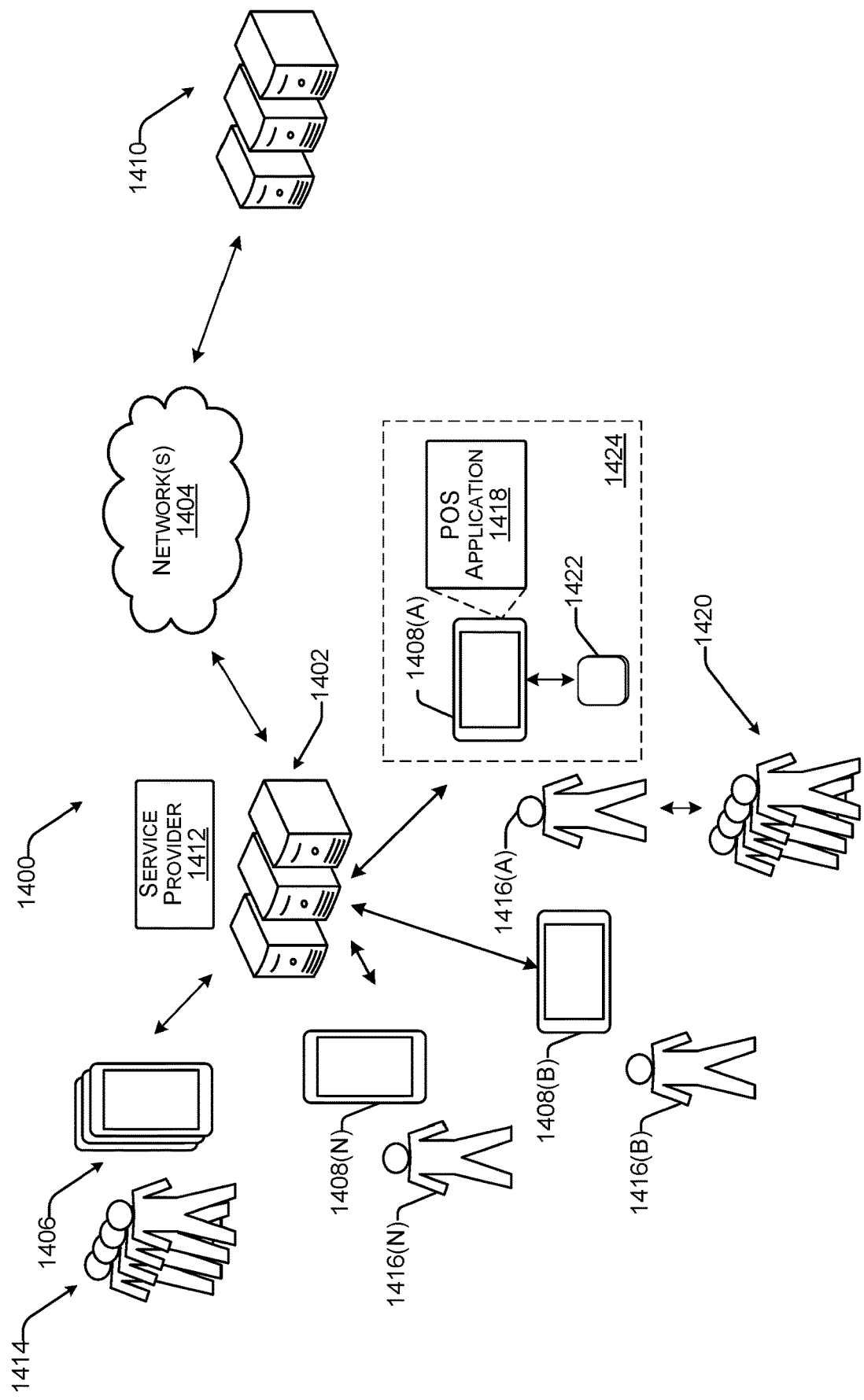
FIG. 14 illustrates an example environment for performing techniques described herein.

FIG. 14 illustrates an example environment 1400. The environment 1400 includes server computing device(s) 1402 that can communicate over a network 1404 with user devices 1406 (which, in some examples can be merchant devices 1408 (individually, 1408(A)-1408(N))) and/or server computing device(s) 1410 associated with third-party service provider(s). The server computing device(s) 1402 can be associated with a service provider 1412 that can provide one or more services for the benefit of users 1414, as described below. Actions attributed to the service provider 1412 can be performed by the server computing device(s) 1402.

With reference to FIG. 1, the server computing device(s) 1402 can correspond to the server computing device(s) 102. Furthermore, the user devices 1406 can correspond to the merchant computing device 104, the photographer courier computing device 106, and/or the image capturing device 108. The users 1414 can include the merchant 122, the photographer courier 126, etc. In at least one example, the service provider 1412 can correspond to the ecommerce service provider and/or the payment processing service provider described above with reference to FIGS. 1-13. The network(s) described above with reference to FIGS. 1-4 can correspond to the network 1404.

The environment 1400 can include a plurality of user devices 1406, as described above. Each one of the plurality of user devices 1406 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1414. The users 1414 can be referred to as customers, buyers, merchants, sellers, borrowers, employees, employers, payors, payees, couriers and so on. The users 1414 can interact with the user devices 1406 via user interfaces presented via the user devices 1406. In at least one example, a user interface can be presented via a web browser, or the like. In other examples, a user interface can be presented via an application, such as a mobile application or desktop application, which can be provided by the service provider 1412 or which can be an otherwise dedicated application. In some examples, individual of the user devices 1406 can have an instance or versioned instance of an application, which can be downloaded from an application store, for example, which can present the user interface(s) described herein. In at least one example, a user 1414 can interact with the user interface via touch input, spoken input, or any other type of input.

As described above, in at least one example, the users 1414 can include merchants 1416 (individually, 1416(A)-1416(N)). In an example, the merchants 1416 can operate respective merchant devices 1408, which can be user devices 1406 configured for use by merchants 1416. For the purpose of this discussion, a "merchant" can be any entity that offers items (e.g., goods or services) for purchase or other means of acquisition (e.g., rent, borrow, barter, etc.). The merchants 1416 can offer items for purchase or other means of acquisition via brick-and-mortar stores, mobile stores (e.g., pop-up shops, food trucks, etc.), online stores, combinations of the foregoing, and so forth. In some examples, at least some of the merchants 1416 can be associated with a same entity but can have different merchant locations and/or can have franchise/franchisee relationships. In additional or alternative examples, the merchants 1416 can be different merchants. That is, in at least one example, the merchant 1416(A) is a different merchant than the merchant 1416(B) and/or the merchant 1416(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 1408 can have an instance of a POS application 1418 stored thereon. The POS application 1418 can configure the merchant device 1408 as a POS terminal, which enables the merchant 1416(A) to interact with one or more customers 1420. As described above, the users 1414 can include customers, such as the customers 1420 shown as interacting with the merchant 1416(A). For the purpose of this discussion, a "customer" can be any entity that acquires items from merchants. While only two customers 1420 are illustrated in FIG. 14, any number of customers 1420 can interact with the merchants 1416. Further, while FIG. 14 illustrates the customers 1420 interacting with the merchant 1416(A), the customers 1420 can interact with any of the merchants 1416.

In at least one example, interactions between the customers 1420 and the merchants 1416 that involve the exchange of funds (from the customers 1420) for items (from the merchants 1416) can be referred to as "POS transactions" and/or "transactions." In at least one example, the POS application 1418 can determine transaction data associated with the POS transactions. Transaction data can include payment information, which can be obtained from a reader device 1422 associated with the merchant device 1408(A), user authentication data, purchase amount information, point-of-purchase information (e.g., item(s) purchased, date of purchase, time of purchase, etc.), etc. The POS application 1418 can send transaction data to the server computing device(s) 1402. Furthermore, the POS application 1418 can present a UI to enable the merchant 1416(A) to interact with the POS application 1418 and/or the service provider 1412 via the POS application 1418.

In at least one example, the merchant device 1408(A) can be a special-purpose computing device configured as a POS terminal (via the execution of the POS application 1418). In at least one example, the POS terminal may be connected to a reader device 1422, which is capable of accepting a variety of payment instruments, such as credit cards, debit cards, gift cards, short-range communication based payment instruments, and the like, as described below. In at least one example, the reader device 1422 can plug in to a port in the merchant device 1408(A), such as a microphone port, a headphone port, an audio-jack, a data port, or other suitable port. In additional or alternative examples, the reader device 1422 can be coupled to the merchant device 1408(A) via another wired or wireless connection, such as via a Bluetooth®, BLE, and so on. Additional details are described below with reference to FIG. 15. In some examples, the reader device 1422 can read information from alternative payment instruments including, but not limited to, wristbands and the like.

In some examples, the reader device 1422 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 1422, and communicate with the server computing device(s) 1402, which can provide, among other services, a payment processing service. The server computing device(s) 1402 associated with the service provider 1412 can communicate with server computing device(s) 1410, as described below. In this manner, the POS terminal and reader device 1422 may collectively process transaction(s) between the merchants 1416 and customers 1420. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, to allow for information from the secondary terminal to be shared between the primary POS terminal(s) and secondary terminal(s).

While, the POS terminal and the reader device 1422 of the POS system 1424 are shown as separate devices, in additional or alternative examples, the POS terminal and the reader device 1422 can be part of a single device. In some examples, the reader device 1422 can have a display integrated therein for presenting information to the customers 1420. In additional or alternative examples, the POS terminal can have a display integrated therein for presenting information to the customers 1420. POS systems, such as the POS system 1424, may be mobile, such that POS terminals and reader devices may process transactions in disparate locations across the world. POS systems can be used for processing card-present transactions and card-not-present (CNP) transactions, as described below.

A card-present transaction is a transaction where both a customer 1420 and his or her payment instrument are physically present at the time of the transaction. Card-present transactions may be processed by swipes, dips, taps, or any other interaction between a physical payment instrument (e.g., a card), or otherwise present payment instrument, and a reader device 1422 whereby the reader device 1422 is able to obtain payment data from the payment instrument. A swipe is a card-present transaction where a customer 1420 slides a card, or other payment instrument, having a magnetic strip through a reader device 1422 that captures payment data contained in the magnetic strip. A dip is a card-present transaction where a customer 1420 inserts a payment instrument having an embedded microchip (i.e., chip) into a reader device 1422 first. The dipped payment instrument remains in the payment reader until the reader device 1422 prompts the customer 1420 to remove the card, or other payment instrument. While the payment instrument is in the reader device 1422, the microchip can create a one-time code which is sent from the POS system 1424 to the server computing device(s) 1410 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 1420 may tap or hover his or her payment instrument (e.g., card, electronic device such as a smart phone running a payment application, etc.) over a reader device 1422 to complete a transaction via short-range communication (e.g., NFC, RFID, Bluetooth®, BLE, etc.). Short-range communication enables the payment instrument to exchange information with the reader device 1422. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 1424, the server computing device(s) 1402, and/or the server computing device(s) 1410 may exchange payment information and transaction data to determine whether transactions are authorized. For example, the POS system 1424 may provide encrypted payment data, user authentication data, purchase amount information, point-of-purchase information, etc. (collectively, transaction data) to server computing device(s) 1402 over the network(s) 1404. The server computing device(s) 1402 may send the transaction data to the server computing device(s) 1410. As described above, in at least one example, the server computing device(s) 1410 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server computing device(s) 1410 associated therewith) can send a fund transfer request to a server computing device of a card payment network (e.g., Mastercard®, VISA®, etc.) to determine whether the transaction is authorized or deficient. In at least one example, the service provider 1412 can serve as an acquirer and connect directly with the card payment network.

The card payment network (e.g., the server computing device(s) 1410 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server computing device(s) 1410 associated therewith) can make a determination as to whether the customer has the capacity to absorb the relevant charge associated with the payment transaction. In at least one example, the service provider 1412 can serve as an issuer and/or can partner with an issuer. The transaction is either approved or rejected by the issuer and/or the card payment network (e.g., the server computing device(s) 1410 associated therewith), and a payment authorization message is communicated from the issuer to the POS device via a path opposite of that described above, or via an alternate path.

As described above, the server computing device(s) 1410, which can be associated with payment service provider(s), may determine whether the transaction is authorized based on the transaction data, as well as information relating to parties to the transaction (e.g., the customer 1420 and/or the merchant 1416(A)). The server computing device(s) 1410 may send an authorization notification over the network(s) 1404 to the server computing device(s) 1402, which may send the authorization notification to the POS system 1424 over the network(s) 1404 to indicate whether the transaction is authorized. The server computing device(s) 1402 may also transmit additional information such as transaction identifiers to the POS system 1424. In one example, the server computing device(s) 1402 may include a merchant application and/or other functional components for communicating with the POS system 1424 and/or the server computing device(s) 1410 to authorize or decline transactions.

Based on the authentication notification that is received by the POS system 1424 from server computing device(s) 1402, the merchant 1416(A) may indicate to the customer 1420 whether the transaction has been approved. In some examples, approval may be indicated at the POS system 1424, for example, at a display of the POS system 1424. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider 1412 can provide, among other services, payment processing services, inventory management services, catalog management services, business banking services, financing services, web-development services, payroll services, employee management services, appointment services, restaurant management services, order management services, delivery/courier services, peer-to-peer payment services, onboarding services, identity verification (IDV) services, and so on. In some examples, the users 1414 can access all of the services of the service provider 1412. In other examples, the users 1414 can have gradated access to the services, which can be based on risk tolerance, IDV outputs, subscriptions, and so on. In at least one example, access to such services can be availed to the merchants 1416 via the POS application 1418. In additional or alternative examples, each service can be associated with its own access point (e.g., application, web browser, etc.).

The service provider 1412 can offer payment processing services for processing payments on behalf of the merchants 1416, as described above. For example, the service provider 1412 can provision payment processing software, payment processing hardware and/or payment processing services to merchants 1416, as described above, to enable the merchants 1416 to receive payments from the customers 1420 when conducting POS transactions with the customers 1420. For instance, the service provider 1412 can enable the merchants 1416 to receive cash payments, payment card payments, and/or electronic payments from customers 1420 for POS transactions and the service provider 1412 can process transactions on behalf of the merchants 1416.

As the service provider 1412 processes transactions on behalf of the merchants 1416, the service provider 1412 can maintain accounts or balances for the merchants 1416 in one or more ledgers. For example, the service provider 1412 can analyze transaction data received for a transaction to determine an amount of funds owed to a merchant 1416(A) for the transaction. In at least one example, such an amount can be a total purchase price less fees charged by the service provider 1412 for providing the payment processing services. Based on determining the amount of funds owed to the merchant 1416(A), the service provider 1412 can deposit funds into an account of the merchant 1416(A). The account can have a stored balance, which can be managed by the service provider 1412. The account can be different from a conventional bank account at least because the stored balance is managed by a ledger of the service provider 1412 and the associated funds are accessible via various withdrawal channels including, but not limited to, scheduled deposit, same-day deposit, instant deposit, and a linked payment instrument.

A scheduled deposit can occur when the service provider 1412 transfers funds associated with a stored balance of the merchant 1416(A) to a bank account of the merchant 1416(A) that is held at a bank or other financial institution (e.g., associated with the server computing device(s) 1410). Scheduled deposits can occur at a prearranged time after a POS transaction is funded, which can be a business day after the POS transaction occurred, or sooner or later. In some examples, the merchant 1416(A) can access funds prior to a scheduled deposit. For instance, the merchant 1416(A) may have access to same-day deposits (e.g., wherein the service provider 1412 deposits funds from the stored balance to a linked bank account of the merchant on a same day as POS transaction, in some examples prior to the POS transaction being funded) or instant deposits (e.g., wherein the service provider 1412 deposits funds from the stored balance to a linked bank account of the merchant on demand, such as responsive to a request). Further, in at least one example, the merchant 1416(A) can have a payment instrument that is linked to the stored balance that enables the merchant to access the funds without first transferring the funds from the account managed by the service provider 1412 to the bank account of the merchant 1416(A).

In at least one example, the service provider 1412 may provide inventory management services. That is, the service provider 1412 may provide inventory tracking and reporting. Inventory management services may enable the merchant 1416(A) to access and manage a database storing data associated with a quantity of each item that the merchant 1416(A) has available (i.e., an inventory). Furthermore, in at least one example, the service provider 1412 can provide catalog management services to enable the merchant 1416(A) to maintain a catalog, which can be a database storing data associated with items that the merchant 1416(A) has available for acquisition (i.e., catalog management services). In at least one example, the catalog may include a plurality of data items and a data item of the plurality of data items may represent an item that the merchant 1461(A) has available for acquisition.

In at least one example, the service provider 1412 can provide business banking services, which allow the merchant 1416(A) to track deposits (from payment processing and/or other sources of funds) into an account of the merchant 1416(A), payroll payments from the account (e.g., payments to employees of the merchant 1416(A)), payments to other merchants (e.g., business-to-business) directly from the account or from a linked debit card, withdrawals made via scheduled deposit and/or instant deposit, etc. Furthermore, the business banking services can enable the merchant 1416(A) to check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 1416 to visualize their cash flow to track their financial health, set aside money for upcoming obligations (e.g., savings), organize money around goals, etc.

In at least one example, the service provider 1412 can provide financing services and products, such as via business loans, consumer loans, fixed term loans, flexible term loans, and the like. In at least one example, the service provider 1412 can utilize one or more risk signals to determine whether to extend financing offers and/or terms associated with such financing offers.

In at least one example, the service provider 1412 can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider 1412 can offer different types of capital loan products. For instance, in at least one example, the service provider 1412 can offer a daily repayment loan product, wherein a capital loan is repaid daily, for instance, from a portion of transactions processed by the payment processing service on behalf of the borrower. Additionally and/or alternatively, the service provider 1412 can offer a monthly repayment loan product, wherein a capital loan is repaid monthly, for instance, via a debit from a bank account linked to the payment processing service.

Additionally or alternatively, the service provider 1412 can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 1416. The service provider 1412 can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider 1412 (e.g., from payments owed to the merchant from payments processed on behalf of the merchant, funds transferred to the merchant, etc.). The service provider 1412 can offer specific financial products, such as payment instruments, tied specifically to the loan products. For example, in one implementation, the server provider 1412 associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider 1412 can provide web-development services, which enable users 1414 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example.

Furthermore, the service provider 1412 can provide payroll services to enable employers to pay employees for work performed on behalf of employers. In at least one example, the service provider 1412 can receive data that includes time worked by an employee, sales made by the employee, gratuities received by the employee, and so forth. Based on such data, the service provider 1412 can make payroll payments to employee(s) on behalf of an employer via the payroll service. For instance, the service provider 1412 can facilitate the transfer of a total amount to be paid out for the payroll of an employee from the bank of the employer to the bank of the service provider 1412 to be used to make payroll payments. In at least one example, when the funds have been received at the bank of the service provider 1412, the service provider 1412 can pay the employee, such as by check or direct deposit, often a day, a week, or more after when the work was actually performed by the employee. In additional or alternative examples, the service provider 1412 can enable employee(s) to receive payments via same-day or instant deposit based at least in part on risk and/or reliability analyses performed by the service provider 1412.

Moreover, in at least one example, the service provider 1412 can provide employee management services for managing schedules of employees. Further, the service provider 1412 can provide appointment services for enabling users 1414 to set schedules for scheduling appointments and/or users 1414 to schedule appointments.

In some examples, the service provider 1412 can provide restaurant management services to enable users 1414 to make and/or manage reservations, to monitor front-of-house and/or back-of-house operations, and so on. In such examples, the merchant device(s) 1408 and/or server computing device(s) 1402 can be configured to communicate with one or more other computing devices, which can be located in the front-of-house (e.g., POS device(s)) and/or back-of-house (e.g., kitchen display system(s) (KDS)). In at least one example, the service provider 1412 can provide order management services and/or delivery services to enable restaurants to manage open tickets, split tickets, and so on and/or manage delivery services. In some examples, such services can be associated with restaurant merchants, as described above. In additional or alternative examples, such services can be any type of merchant.

In at least one example, the service provider 1412 can provide courier services, wherein couriers can travel between multiple locations to provide delivery services, photography services, etc. Couriers can be users 1414 who can travel between locations to perform services for a requesting user 1414 (e.g., deliver items, capture images, etc.). In some examples, the courier can receive compensation from the service provider 1412. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider 1412 can receive requests for courier services, automatically assign the requests to active couriers, and communicate dispatch instructions to couriers via user interface (e.g., application, web browser, or other access point) presented via respective devices 1406.

In at least one example, the service provider 1412 can provide a peer-to-peer payment service that enables peer-to-peer payments between two or more users 1414. In at least one example, the service provider 1412 can communicate with instances of a payment application (or other access point) installed on devices 1406 configured for operation by users 1414. In an example, an instance of the payment application executing on a first device operated by a payor can send a request to the service provider 1412 to transfer an amount of funds (e.g., fiat currency or non-fiat currency such as cryptocurrency, securities, and related assets) from an account of the payor to an account of a payee (e.g., a peer-to-peer payment). The service provider 1412 can facilitate the transfer and can send a notification to an instance of the payment application executing on a second mobile device operated by the payee that the transfer is in process (or has been completed). In some examples, the service provider 1412 can send additional or alternative information to the instances of the payment application (e.g., low balance to the payor, current balance to the payor or the payee, etc.). In some examples, the payor can transfer funds to the payee unprompted. In other examples, the payee can send a request for funds to the payor prior to the payor initiating the transfer of funds. The funds transferred can be associated with any digital currency type, including, but not limited to, cash, cryptocurrency, etc.

In at least one example, a user 1414 may be new to the service provider 1412 such that the user 1414 that has not registered (e.g., subscribed to receive access to one or more services offered by the service provider) with the service provider 1412. The service provider 1412 can offer onboarding services for registering a potential user 1414 with the service provider 1412. In some examples, onboarding can involve presenting various questions, prompts, and the like to a potential user 1414 to obtain information that can be used to generate a profile for the potential user 1414. In at least one example, the service provider 1412 can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 1414 providing all necessary information, the potential user 1414 can be onboarded to the service provider 1412. In such an example, any limited or short-term access to services of the service provider 1412 can be transitioned to more permissive (e.g., less limited) or longer-term access to such services.

The service provider 1412 can be associated with IDV services, which can be used by the service provider 1412 for compliance purposes and/or can be offered as a service, for instance to third-party service providers (e.g., associated with the server computing device(s) 1410). That is, the service provider 1412 can offer IDV services to verify the identity of users 1414 seeking to use or using their services. Identity verification requires a customer (or potential customer) to provide information that is used by compliance departments to prove that the information is associated with an identity of a real person or entity. In at least one example, the service provider 1412 can perform services for determining whether identifying information provided by a user 1414 accurately identifies the customer (or potential customer) (i.e., Is the customer who they say they are?).

The service provider 1412 is capable of providing additional or alternative services and the services described above are offered as a sampling of services. In at least one example, the service provider 1412 can exchange data with the server computing device(s) 1410 associated with third-party service providers. Such third-party service providers can provide information that enables the service provider 1412 to provide services, such as those described above. In additional or alternative examples, such third-party service providers can access services of the service provider 1412.

That is, in some examples, the third-party service providers can be subscribers, or otherwise access, services of the service provider 1412.

Techniques described herein can be configured to operate in both real-time/online and offline modes. "Online" modes refer to modes when devices are capable of communicating with the service provider 1412 (e.g., the server computing device(s) 1402) and/or the server computing device(s) 1410 via the network(s) 1404. In some examples, the merchant device(s) 1408 are not capable of connecting with the service provider 1412 (e.g., the server computing device(s) 1402) and/or the server computing device(s) 1410, due to a network connectivity issue, for example. In additional or alternative examples, the server computing device(s) 1402 are not capable of communicating with the server computing device(s) 1410 due to network connectivity issue, for example. In such examples, devices may operate in "offline" mode where at least some payment data is stored (e.g., on the merchant device(s) 1408) and/or the server computing device(s) 1402 until connectivity is restored and the payment data can be transmitted to the server computing device(s) 1402 and/or the server computing device(s) 1410 for processing.

Techniques described herein are directed to services provided via a distributed system of user devices 1406 that are in communication with one or more server computing devices 1402 of the service provider 1412. That is, techniques described herein are directed to a specific implementation—or, a practical application—of utilizing a distributed system of user devices 1406 that are in communication with one or more server computing devices 1402 of the service provider 1412 to perform a variety of services, as described above. The unconventional configuration of the distributed system described herein enables the server computing device(s) 1402 that are remotely-located from end-users (e.g., users 1414) to intelligently offer services based on aggregated data associated with the end-users, such as the users 1414 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. As described herein, artificial intelligence, machine learning, and the like can be used to dynamically make determinations, recommendations, and the like, thereby adding intelligence to an otherwise one-size-fits-all scheme for providing payment processing services and/or additional or alternative services described herein. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1414 and user devices 1406. Furthermore, such features are changed dynamically based on the profiles of the users involved interacting with the GUIs. As such, techniques described herein are directed to improvements to computing systems.

Figure 15:
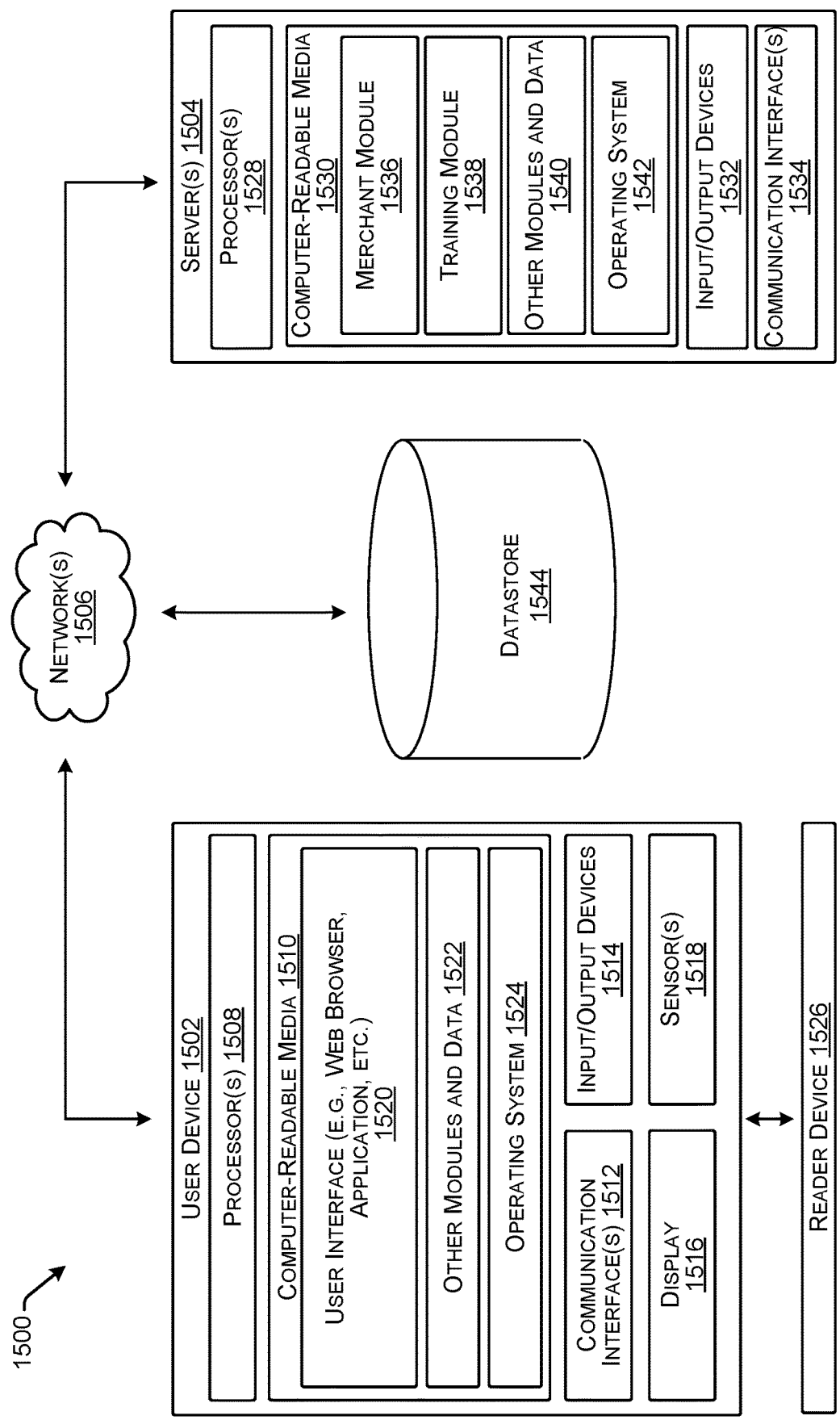
FIG. 15 depicts an illustrative block diagram illustrating a system for performing techniques described herein.

FIG. 15 depicts an illustrative block diagram illustrating a system 1500 for performing techniques described herein. The system 1500 includes a user device 1502, that communicates with server computing device(s) (e.g., server(s) 1504) via network(s) 1506 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1502 is illustrated, in additional or alternate examples, the system 1500 can have multiple user devices, as described above with reference to FIG. 14. For example, the user device 1502 can correspond to any one of the merchant computing device 104 the photographer courier computing device 106, or the image capturing device 108, as described above with reference to FIG. 1. The network(s) described above with reference to FIGS. 1-4 can correspond to the network(s) 1506.

In at least one example, the user device 1502 can be any suitable type of computing device, e.g., portable, semi-portable, semi-stationary, or stationary. Some examples of the user device 1502 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1502 can be any computing device capable of sending communications and performing the functions according to the techniques described herein. The user device 1502 can include devices, e.g., payment card readers, or components capable of accepting payments, as described below.

In the illustrated example, the user device 1502 includes one or more processors 1508, one or more computer-readable media 1510, one or more communication interface(s) 1512, one or more input/output (I/O) devices 1514, a display 1516, and sensor(s) 1518.

In at least one example, each processor 1508 can itself comprise one or more processors or processing cores. For example, the processor(s) 1508 can be implemented as one or more microprocessors, microcomputers, microcontrollers, digital signal processors, central processing units, state machines, logic circuitries, and/or any devices that manipulate signals based on operational instructions. In some examples, the processor(s) 1508 can be one or more hardware processors and/or logic circuits of any suitable type specifically programmed or configured to execute the algorithms and processes described herein. The processor(s) 1508 can be configured to fetch and execute computer-readable processor-executable instructions stored in the computer-readable media 1510.

Depending on the configuration of the user device 1502, the computer-readable media 1510 can be an example of tangible non-transitory computer storage media and can include volatile and nonvolatile memory and/or removable and non-removable media implemented in any type of technology for storage of information such as computer-readable processor-executable instructions, data structures, program modules or other data. The computer-readable media 1510 can include, but is not limited to, RAM, ROM, EEPROM, flash memory, solid-state storage, magnetic disk storage, optical storage, and/or other computer-readable media technology. Further, in some examples, the user device 1502 can access external storage, such as RAID storage systems, storage arrays, network attached storage, storage area networks, cloud storage, or any other medium that can be used to store information and that can be accessed by the processor(s) 1508 directly or through another computing device or network. Accordingly, the computer-readable media 1510 can be computer storage media able to store instructions, modules or components that can be executed by the processor(s) 1508. Further, when mentioned, non-transitory computer-readable media exclude media such as energy, carrier signals, electromagnetic waves, and signals per se.

The computer-readable media 1510 can be used to store and maintain any number of functional components that are executable by the processor(s) 1508. In some implementations, these functional components comprise instructions or programs that are executable by the processor(s) 1508 and that, when executed, implement operational logic for performing the actions and services attributed above to the user device 1502. Functional components stored in the computer-readable media 1510 can include a user interface 1520 to enable users to interact with the user device 1502, and thus the server(s) 1504 and/or other networked devices. In at least one example, the user interface 1520 can be presented via a web browser, or the like. In other examples, the user interface 1520 can be presented via an application, such as a mobile application or desktop application, which can be provided by a service provider 1412 associated with the server(s) 1504, or which can be an otherwise dedicated application. In some examples, the user interface 1520 can be the ecommerce user interface 124, the courier user interface 128, or the image capturing user interface 130. In at least one example, a user can interact with the user interface via touch input, spoken input, gesture, or any other type of input. The word "input" is also used to describe "contextual" input that may not be directly provided by the user via the user interface 1520. For example, user's interactions with the user interface 1520 are analyzed using, e.g., natural language processing techniques, to determine context or intent of the user, which may be treated in a manner similar to "direct" user input.

Depending on the type of the user device 1502, the computer-readable media 1510 can also optionally include other functional components and data, such as other modules and data 1522, which can include programs, drivers, etc., and the data used or generated by the functional components. In addition, the computer-readable media 1510 can also store data, data structures and the like, that are used by the functional components. Further, the user device 1502 can include many other logical, programmatic and physical components, of which those described are merely examples that are related to the discussion herein.

In at least one example, the computer-readable media 1510 can include additional functional components, such as an operating system 1524 for controlling and managing various functions of the user device 1502 and for enabling basic user interactions.

The communication interface(s) 1512 can include one or more interfaces and hardware components for enabling communication with various other devices, such as over the network(s) 1506 or directly. For example, communication interface(s) 1512 can enable communication through one or more network(s) 1506, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1506 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1502 can further include one or more input/output (I/O) devices 1514. The I/O devices 1514 can include speakers, a microphone, a camera, and various user controls (e.g., buttons, a joystick, a keyboard, a keypad, etc.), a haptic output device, and so forth. The I/O devices 1514 can also include attachments that leverage the accessories (audio-jack, USB-C, Bluetooth, etc.) to connect with the user device 1502.

In at least one example, user device 1502 can include a display 1516. Depending on the type of computing device(s) used as the user device 1502, the display 1516 can employ any suitable display technology. For example, the display 1516 can be a liquid crystal display, a plasma display, a light emitting diode display, an OLED (organic light-emitting diode) display, an electronic paper display, or any other suitable type of display able to present digital content thereon. In at least one example, the display 1516 can be an augmented reality display, a virtually reality display, or any other display able to present and/or project digital content. In some examples, the display 1516 can have a touch sensor associated with the display 1516 to provide a touchscreen display configured to receive touch inputs for enabling interaction with a graphic interface presented on the display 1516. Accordingly, implementations herein are not limited to any particular display technology. Alternatively, in some examples, the user device 1502 may not include the display 1516, and information can be presented by other means, such as aurally, haptically, etc.

In addition, the user device 1502 can include sensor(s) 1518. The sensor(s) 1518 can include a GPS device able to indicate location information. Further, the sensor(s) 1518 can include, but are not limited to, an accelerometer, gyroscope, compass, proximity sensor, camera, microphone, and/or a switch.

Additionally, the user device 1502 can include various other components that are not shown, examples of which include removable storage, a power source, such as a battery and power control unit, a barcode scanner, a printer, a cash drawer, and so forth.

In addition, in some examples, the user device 1502 can include, be connectable to, or otherwise be coupled to a reader device 1526, for reading payment instruments and/or identifiers associated with payment objects. In some examples, as described above, the reader device 1526 can plug in to a port in the user device 1502, such as a microphone port, a headphone port, an audio-jack, a data port, or other suitable port. In additional or alternative examples, the reader device 1526 can be coupled to the user device 1502 via another wired or wireless connection, such as via a Bluetooth®, BLE, and so on. The reader device 1526 can include a read head for reading a magnetic strip of a payment card, and further can include encryption technology for encrypting the information read from the magnetic strip. Additionally or alternatively, the reader device 1526 can be an EMV payment reader, which in some examples, can be embedded in the user device 1502. Moreover, numerous other types of readers can be employed with the user device 1502 herein, depending on the type and configuration of the user device 1502.

The reader device 1526 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1526 may include hardware implementation, such as slots, magnetic tracks, and rails with one or more sensors or electrical contacts to facilitate detection and acceptance of a payment instrument. That is, the reader device 1526 may include hardware implementations to enable the reader device 1526 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1526 may also include a biometric sensor to receive and process biometric characteristics and process them as payment instruments, given that such biometric characteristics are registered with the payment service system 100 and connected to a financial account with a bank server.

The reader device 1526 may include processing unit(s), computer-readable media, a reader chip, a transaction chip, a timer, a clock, a network interface, a power supply, and so on. The processing unit(s) of the reader device 1526 may execute one or more modules and/or processes to cause the reader device 1526 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program modules, program data, and/or one or more operating systems. Depending on the exact configuration and type of the reader device 1526, the computer-readable media may include volatile memory (such as RAM), non-volatile memory (such as ROM, flash memory, miniature hard drive, memory card, or the like), or some combination thereof. In at least one example, the computer-readable media of the reader device 1526 may include at least one module for performing various functions as described herein.

The reader chip may perform functionalities to control the operations and processing of the reader device 1526. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock 156, which may provide a clock signal indicating a time. Furthermore, the reader chip may perform functionality to control the network interface, which may interface with the network(s) 1506, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1526. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 1502, which can be a POS terminal, and the reader device 1526 are shown as separate devices, in additional or alternative examples, the user device 1502 and the reader device 1526 can be part of a single device, which may be a battery-operated device. In such an example, components of both the user device 1502 and the reader device 1526 may be associated with the single device. In some examples, the reader device 1526 can have a display integrated therewith, which can be in addition to (or as an alternative of) the display 1516 associated with the user device 1502.

The server(s) 1504 can include one or more servers or other types of computing devices that can be embodied in any number of ways. For example, in the example of a server, the modules, other functional components, and data can be implemented on a single server, a cluster of servers, a server farm or data center, a cloud-hosted computing service, a cloud-hosted storage service, and so forth, although other computer architectures can additionally or alternatively be used. In at least one example, the server(s)

1504 can correspond to the server computing device(s) 102 described above with reference to FIG. 1.

Further, while the figures illustrate the components and data of the server(s) 1504 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1504 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1504 can include one or more processors 1528, one or more computer-readable media 1530, one or more I/O devices 1532, and one or more communication interfaces 1534. Each processor 1528 can be a single processing unit or a number of processing units, and can include single or multiple computing units or multiple processing cores. The processor(s) 1528 can be implemented as one or more microprocessors, microcomputers, microcontrollers, digital signal processors, central processing units, state machines, logic circuitries, and/or any devices that manipulate signals based on operational instructions. For example, the processor(s) 1528 can be one or more hardware processors and/or logic circuits of any suitable type specifically programmed or configured to execute the algorithms and processes described herein. The processor(s) 1528 can be configured to fetch and execute computer-readable instructions stored in the computer-readable media 1530, which can program the processor(s) 1528 to perform the functions described herein.

The computer-readable media 1530 can include volatile and nonvolatile memory and/or removable and non-removable media implemented in any type of technology for storage of information, such as computer-readable instructions, data structures, program modules, or other data. Such computer-readable media 1530 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1504, the computer-readable media 1530 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1530 can be used to store any number of functional components that are executable by the processor(s) 1528. In many implementations, these functional components comprise instructions or programs that are executable by the processors 1528 and that, when executed, specifically configure the one or more processors 1528 to perform the actions attributed above to the service provider 1412 and/or payment processing service. Functional components stored in the computer-readable media 1530 can optionally include a merchant module 1536, a training module 1538, and one or more other modules and data 1540.

The merchant module 1536 can be configured to receive transaction data from POS systems, such as the POS system 1424 described above with reference to FIG. 14. The merchant module 1536 can transmit requests (e.g., authorization, capture, settlement, etc.) to payment service server computing device(s) to facilitate POS transactions between merchants and customers. The merchant module 1536 can communicate the successes or failures of the POS transactions to the POS systems. In some examples, the payment processing module 116, described above, and the merchant module 1536 can perform the same or similar functions.

The training module 1538 can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1502 and/or the server(s) 1504 for use at a time after the data models have been trained (e.g., at runtime).

The one or more other modules and data 1540 can include the content module 110, the onboarding module 112, the courier management module 114, and the payment processing module 116, the functionality of which is described, at least partially, above. Further, the one or more other modules and data 1540 can include programs, drivers, etc., and the data used or generated by the functional components. Further, the server(s) 1504 can include many other logical, programmatic and physical components, of which those described above are merely examples that are related to the discussion herein.

The one or more "modules" referenced herein may be implemented as more modules or as fewer modules, and functions described for the modules may be redistributed depending on the details of the implementation. The term "module," as used herein, refers broadly to software stored on non-transitory storage medium (e.g., volatile or non-volatile memory for a computing device), hardware, or firmware (or any combination thereof) modules. Modules are typically functional such that they that may generate useful data or other output using specified input(s). A module may or may not be self-contained. An application program (also called an "application") may include one or more modules, or a module may include one or more application programs that can be accessed over a network or downloaded as software onto a device (e.g., executable code causing the device to perform an action). An application program (also called an "application") may include one or more modules, or a module may include one or more application programs. In additional and/or alternative examples, the module(s) may be implemented as computer-readable instructions, various data structures, and so forth via at least one processing unit to configure the computing device(s) described herein to execute instructions and to perform operations as described herein.

In some examples, a module may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1530 can additionally include an operating system 1542 for controlling and managing various functions of the server(s) 1504.

The communication interface(s) 1534 can include one or more interfaces and hardware components for enabling communication with various other devices, such as over the network(s) 1506 or directly. For example, communication interface(s) 1534 can enable communication through one or more network(s) 1506, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1502 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1504 can further be equipped with various I/O devices 1532. Such I/O devices 1532 can include a display, various user interface controls (e.g., buttons, joystick, keyboard, mouse, touch screen, biometric or sensory input devices, etc.), audio speakers, connection ports and so forth.

In at least one example, the system 1500 can include a datastore 1544 that can be configured to store data that is accessible, manageable, and updatable. In some examples, the datastore 1544 can be integrated with the user device 1502 and/or the server(s) 1504. In other examples, as shown in FIG. 15, the datastore 1544 can be located remotely from the server(s) 1504 and can be accessible to the server(s) 1504. The datastore 1544 can comprise multiple databases and/or servers connected locally and/or remotely via the network(s) 1506.

In at least one example, the datastore 1544 can store user profiles, which can include merchant profiles, customer profiles, courier profiles, and so on, as described above.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider 1412.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

In at least one example, the account(s) 118, described above with reference to FIG. 1, can include or be associated with the merchant profiles and/or customer profiles described above.

Furthermore, in at least one example, the datastore 1544 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1544 can store additional or alternative types of data (e.g., image(s) 120, etc.) as described herein.

In at least one example, the datastore 1544 can be associated with a brand asset database, which can store information associated with brand assets associated with merchants. A brand asset can be a logo (e.g., text logo, graphic logo, favicon, etc.), a font, a color, an image, an icon, a button style, effects, spacing, and the like used in association with a brand of the merchant. In some examples, a brand asset can be associated with multiple content items, which can be applicable to different end users and/or intended viewers. For instance, a brand asset corresponding to a logo can be associated with a logo that is presented to customers and a logo that is presented to merchants. In some examples, image(s) captured via techniques described herein can be added to the brand asset database and/or data associated with the brand asset database can be used for informing guidance as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various techniques described herein refer to "requests" and/or "prompts." For the purpose of this discussion, a "request" or a "prompt" can be a data item transmitted between computing devices described herein with instructions for performing and/or taking an action (e.g., a "request") and/or a recommendation for performing and/or taking an action (e.g., a "prompt"). In some examples, the "requests" and/or "prompts" can be associated with graphical user interface (GUI) elements that are to be presented via a user interface to communicate the instructions to a user of a respective user device.

Various figures included herein are flowcharts showing example methods involving techniques as described herein. The methods illustrated are described with reference to FIGS. 1, 14, and 15 for convenience and ease of understanding. However, the methods illustrated are not limited to being performed using components described in FIGS. 1, 14, and 15, and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

What is claimed is:

1. A method comprising:
receiving, by one or more servers and via an application executing on a merchant device associated with a merchant, one or more first images of an item, wherein the one or more first images are captured via an image capturing mechanism associated with the merchant device, and wherein the application is provided to the merchant device by an ecommerce service provider;
receiving, by the one or more servers, one or more second images of the item, wherein the one or more second images are obtained via a social media site associated with the merchant;
based at least in part on comparing the one or more first images and the one or more second images, generating, by the one or more servers, a request for one or more third images of the item and guidance for a user in capturing the one or more third images of the item via the image capturing mechanism;
causing presentation, in near-real-time with receiving the one or more second images, by the one or more servers and on a display of the merchant device, of a user interface including the request and the guidance;
receiving, by the one or more servers and from the merchant device, the one or more third images;
based at least in part on comparing the one or more second images and the one or more third images, generating, by the one or more servers in near-real-time with receiving the one or more third images, a content item for the merchant, wherein the content item includes the one or more third images; and
causing presentation, by the one or more servers, of the content item.

2. The method as claim 1 recites, wherein the image capturing mechanism comprises:
a camera mechanism integrated in the application; or
a photo robot connected to the merchant device.

3. The method as claim 1 recites, wherein capturing the one or more first images comprises scanning the item via the image capturing mechanism associated with the merchant device.

4. The method as claim 1 recites, wherein causing presentation of the content item comprises outputting the content item via a webpage associated with the merchant.

5. The method as claim 1 recites, wherein the content item comprises at least one of a social media post, a digital marketing document, a webpage, a marketplace post, or a message.

6. The method as claim 1 recites, further comprising:
based at least in part on receiving the one or more third images, processing, by the one or more servers, the one or more third images to remove a background of at least one of the one or more third images.

7. The method as claim 1 recites, wherein generating the content item comprises generating the content item based at least in part on data associated with an existing merchant account of the merchant with the ecommerce service provider, metadata associated with the one or more second images, or data associated with content items of another merchant presenting an image of a same item as the item.

8. The method as claim 1 recites, wherein the one or more servers performs post-processing image techniques on the one or more third images.

9. The method as claim 1 recites, wherein the guidance is generated via application of a machine learning model associated with the one or more servers.

10. The method as claim 1 recites, wherein the guidance is customized based at least in part on one of (i) a brand standard of the merchant, (ii) a type of image capturing device associated with the image capturing mechanism, or (iii) an intended use of the content item.

11. A method comprising:
receiving, by one or more servers via an application executing on a merchant device associated with a merchant, a first image of an item;
receiving, by the one or more servers, a second image of the item, wherein the second image is obtained via a social media site associated with the merchant;
based at least in part on comparing the first image and the second image, generating, by the one or more servers, a request for a third image of the item and guidance for a user in capturing the third image of the item via the merchant device;

causing presenting, in near-real-time with receiving the second image, by the one or more servers and on a display of the merchant device, of a user interface including the request and the guidance;

receiving, by the one or more servers and from the merchant device, the third image;

based at least in part on comparing the second image and the third image, identifying, by the one or more servers in near-real-time with and responsive to receiving the third image, a content item associated with the merchant with which to associate the third image; and causing presentation, by the one or more servers, of the content item.

12. The method as claim 11 recites, further comprising:

generating, by the one or more servers, a merchant profile for the merchant; and associating, by the one or more servers, the content item with the merchant profile.

13. The method as claim 11 recites, further comprising:

determining, by the one or more servers, that the merchant is associated with an existing merchant account;

accessing, by the one or more servers, data associated with the existing merchant account; and identifying, by the one or more servers, the content item based at least in part on the data associated with the existing merchant account.

14. The method as claim 13 recites, wherein the first image is captured scanning the item via an image capturing mechanism associated with the merchant device.

15. A system comprising:

one or more processors;

one or more computer-executable instructions that, when executed by the one or more processors, cause the one or more processors to perform operations comprising:

receiving, by one or more servers via an application executing on a merchant device associated with a merchant, a first image of an item, wherein the first image is captured via an image capturing mechanism associated with the merchant device;

receiving, by the one or more servers, a second image of the item, wherein the second image is obtained via a social media site associated with the merchant;

based at least in part on comparing the first image and the second image, generating, by the one or more servers, a request for a third image of the item and guidance for a user in capturing the third image of the item via the merchant device;

causing presenting, in near-real-time with receiving the second image, by the one or more servers and on a display of the merchant device, of a user interface including the request and the guidance;

receiving, by the one or more servers and from the merchant device, the third image;

based at least in part on comparing the second image and the third image, generating, by the one or more servers in near real-time, a content item, wherein the content item includes at least the third image; and causing presentation, by the one or more servers, of the content item.

16. The method as claim 15 recites, further comprising:

responsive to receiving the first image, determining, by the one or more servers, that one or more characteristics corresponding to the first image are associated with a performance metric that satisfies a performance threshold.

17. The method as claim 16 recites, wherein determining that the one or more characteristics are associated with the performance metric that satisfies a performance threshold is based at least in part on a predictive model.

18. The method as claim 15 recites, further comprising:

providing, in near real-time by the one or more servers on a display of the merchant device, the guidance as instructions for capturing the third image or modifying an aspect of the third image, wherein the instructions comprise guidance for one or more of a quantity, lighting, views of the item, or a background.

19. The method as claim 18 recites, wherein the instructions are customized based at least in part on a brand standard of the merchant.

20. The method as claim 15 recites, wherein the application comprises an ecommerce application and the one or more servers comprise one or more servers of an ecommerce service provider.

* * * * *